United States Patent
Das et al.

(10) Patent No.: US 11,493,591 B2
(45) Date of Patent: Nov. 8, 2022

(54) SYSTEM AND METHOD FOR DETECTION AND IDENTIFICATION OF RADIO FREQUENCY SOURCE

(71) Applicant: Vehere Interactive Pvt. Ltd., Kolkata (IN)

(72) Inventors: Koyel Das, Nawabganj (IN); Naveen Jaiswal, Kolkata (IN)

(73) Assignee: Vehere Interactive Pvt. Ltd.

( * ) Notice: Subject to any disclaimer, the term of this patent is extended or adjusted under 35 U.S.C. 154(b) by 175 days.

(21) Appl. No.: 16/934,519

(22) Filed: Jul. 21, 2020

(65) Prior Publication Data
US 2021/0025964 A1 Jan. 28, 2021

(30) Foreign Application Priority Data
Jul. 23, 2019 (IN) .............................. 201931029713

(51) Int. Cl.
*G01S 3/02* (2006.01)
*G01S 5/02* (2010.01)
*G01S 5/00* (2006.01)

(52) U.S. Cl.
CPC .......... *G01S 5/0294* (2013.01); *G01S 5/0221* (2013.01); *G01S 5/0273* (2013.01); *G01S 5/011* (2020.05); *G01S 5/0244* (2020.05)

(58) Field of Classification Search
CPC .... G01S 5/0294; G01S 5/0221; G01S 5/0273; G01S 5/0244; G01S 5/011
(Continued)

(56) References Cited

U.S. PATENT DOCUMENTS 6,791,493 B1 9/2004 Rose
7,714,782 B2 * 5/2010 Davis ..................... H01Q 21/22
342/99
(Continued)

FOREIGN PATENT DOCUMENTS

RU 2419106 C1 5/2011
WO WO-2013/112353 A1 * 8/2013 .............. G01S 19/11

OTHER PUBLICATIONS

Abeywickrama et al., "RF-based Direcion Finding of UAVs Using DNN", Dec. 28, 2018, 5 pages, https://arxiv.org/pdf/1712.01154.pdf.
(Continued)

*Primary Examiner* — Chuong P Nguyen
(74) *Attorney, Agent, or Firm* — Lerner, David, Littenberg, Krumholz & Mentlik, LLP

(57) ABSTRACT

The present invention discloses a system and a method for detecting, localizing and categorizing radio frequency (RF) emitting sources. In operation presence of one or more RF sources are determined. Further, movement in the detected one or more RF sources is detected based on at least presence of spread power in spatial harmonics and visibility phase measurement. The frequencies of the radio waves at which the movement of one or more RF sources is detected are identified. A localization antenna subsystem is tuned to the identified frequencies one at a time to localize and identify the RF sources. Furthermore, the RF source is classified as an airborne source or ground-based source using radio interferometry imaging. Finally, on determination that the moving RF source is airborne, the interferometric images are further processed to confirm the type of airborne source.

32 Claims, 10 Drawing Sheets

(58) Field of Classification Search
USPC .................................................. 342/351, 450
See application file for complete search history.

(56) References Cited

U.S. PATENT DOCUMENTS

| | | | |
|---|---|---|---|
| 9,285,456 B2* | 3/2016 | Snoussi | G01S 5/0289 |
| 9,661,604 B1* | 5/2017 | O'Shea | H04W 64/00 |
| 10,466,336 B2* | 11/2019 | O'Shea | G01S 5/0278 |
| 10,498,951 B2* | 12/2019 | Kleinbeck | H04N 5/23218 |
| 10,539,679 B2* | 1/2020 | Yun | G01S 19/21 |
| 10,698,076 B2* | 6/2020 | Jones | G01S 5/04 |
| 2015/0220488 A1 | 8/2015 | Healy | |
| 2019/0005830 A1 | 1/2019 | Just | |
| 2019/0302249 A1* | 10/2019 | High | G01S 7/4804 |
| 2021/0409591 A1* | 12/2021 | Kleinbeck | G01S 5/0221 |

OTHER PUBLICATIONS

Guvenc et al., "Detection, Localization, and Tracking of Unauthorized UAS and Jammers", pp. 1-10, https://ntrs.nasa.gov/archive/nasa/casi.ntrs.nasa.gov/20170009465.pdf.
Radio Astronomy, Wikipedia, downloaded on Jul. 31, 2020, pp. 1-9, https://en.wikipedia.org/wiki/Radio_astronomy.
Website: Interfrometers I, https://www.cv.nrao.edu/course/astr534/Interferometers1.html.
Website: RFeye DroneDefense, https://www.crfs.com/drone-detection/.

* cited by examiner

SYSTEM AND METHOD FOR DETECTION AND IDENTIFICATION OF RADIO FREQUENCY SOURCE

FIELD OF THE INVENTION

The present invention relates generally to the field of surveillance and monitoring, and more particularly, the present invention relates to a system and a method for detecting and identifying drones and other sources that emit radio frequency.

BACKGROUND OF THE INVENTION

Unmanned Aerial Vehicles (UAVs) were originally developed for use in missions where physical reach of humans was challenging. While UAVs such as autonomous drones were implemented mostly for military applications, their use has rapidly expanded to commercial, scientific, recreational, agricultural, and other applications, such as patrolling, surveillance, product deliveries, aerial photography, etc. However, it has been observed that the proliferation in the use of drones has become a concern of private and national security. As a result, one or more drone surveillance systems are required to detect the presence of drones, particularly, in drone prohibited areas.

Conventional UAV detection systems can be broadly categorized into active and passive systems. Active systems are configured to emit radio frequency pulse towards a target and search for reflected pulse from the target to determine the presence of a UAV. The active systems such as RADARs have a high range, however, said systems emit radio frequency pulse (Electromagnetic Magnetic waves) and are themselves detectable by UAV operators which may caution them to prevent UAVs to be detected by such systems. Further, there exists stealth drones which are designed so as not to reflect any energy back to the RADAR system and thus cannot be detected by RADARS.

Passive systems on the other hand are configured to passively receive the frequency transmitted by a source object or transmitter associated with the source object to identify said source object. An example of passive system includes, but is not limited to, phased array systems. Phased array systems are configured to detect a change in direction of frequency radiation incoming from the RF source and thus sense the motion of the source. However, the array configuration in the phased array systems cannot be fixed for a wide band of frequencies. Further, it is difficult to maintain consistency in spacing between the antennas for achieving same beam shape for wide range of frequencies. Another example of passive system is an array of directional antennas which includes a large number of small beam antennas to detect movement of UAVs such as drones. However, implementation of said system is costly. Yet another example of passive systems are acoustic systems which are relatively cheaper, however these systems lack precision due to surrounding noise and interference from acoustic sources around the UAV.

In light of the above drawbacks, there is a need for a system and a method for detecting, localizing and identifying radio frequency emitting sources such as UAVs. There is need for a system and a method capable of isolating UAVs from surrounding noise and sources of interference. There is a need for a system and method which can differentiate between ground based objects and airborne objects. Further, there is a need for a system and a method which provides precise results. Furthermore, there is a need for a system and method which is robust and economic.

SUMMARY OF THE INVENTION

In various embodiments of the present invention, a computation subsystem for detecting, localizing and categorizing Unmanned Aerial Vehicles (UAVs) is provided. The subsystem comprises a memory storing program instructions; and a processor configured to execute program instructions stored in the memory. The computation subsystem is configured to detect presence of one or more RF sources around a desired area based on analysis of power level of radio waves received within a selected frequency band around the desired area from a movement detection antenna array. Further, the computation subsystem is configured to identify frequencies of the radio waves acquired from the detected one or more RF sources. Furthermore, the computation subsystem is configured to determine movement of the detected one or more RF sources based on at least a computation of spatial frequencies of the radio waves to identify presence of spread power in spatial harmonics based on the identified frequencies of the radio waves and the computed spatial frequencies. Yet further, the computation subsystem is configured to identify location of the detected one or more RF sources via a localization antenna subsystem, the localization antenna subsystem (108) is tuned to the identified frequencies of the radio waves, where interferometric images of the detected one or more RF sources are generated. Finally, the computation subsystem is configured to categorize the detected one or more RF source as an airborne source or ground-based source using the generated interferometry images.

In various embodiments of the present invention, a method for detecting, localizing and categorizing Unmanned Aerial Vehicles (UAVs) is provided. The method is implemented by at least one processor executing program instructions stored in a memory. The method comprises detecting presence of one or more RF sources (102) around a desired area based on analysis of power level of radio waves received within a selected frequency band around the desired area from a movement detection antenna array 106. The method further comprises identifying frequencies of the radio waves acquired from the detected one or more RF sources. Further, the method comprises determining movement of the detected one or more RF sources based on at least a computation of spatial frequencies of the radio waves to identify presence of spread power in spatial harmonics based on the identified frequencies of the radio waves and the computed spatial frequencies. Furthermore, the method comprises identifying location of the detected one or more RF sources via a localization antenna subsystem (108), where the localization antenna subsystem (108) is tuned to the identified frequencies of the radio waves and interferometric images of the detected one or more RF sources are generated. Finally, the method comprises categorizing the detected one or more RF source as an airborne source or ground-based source using the generated interferometry images.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

Figure 1:
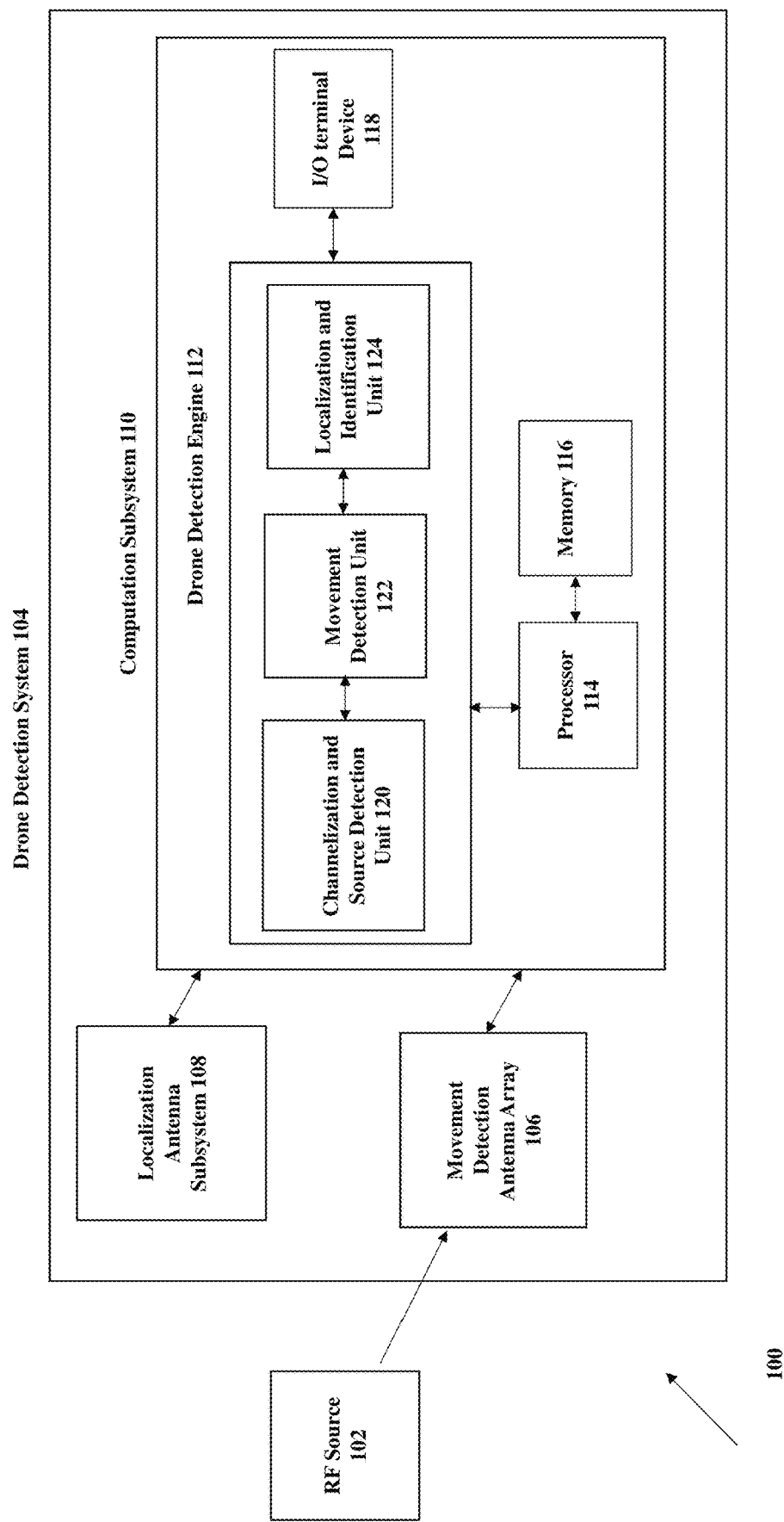
FIG. 1 illustrates a detailed block diagram of a system for detecting, localizing and categorizing Unmanned Aerial Vehicles (UAVs), in accordance with an embodiment of the present invention.

The present invention discloses a system and a method for detecting, localizing and categorizing Radio frequency (RF) emitting sources such as UAV's. In particular, the present invention provides a system and a method which isolates Unmanned Aerial Vehicles (UAVs) from other RF emitting sources and surrounding sources of interference and identifies the type of UAV such as a drone. In operation, the present invention provides a movement detection antenna array comprising two or more antennas separated by respective baselines. The present invention provides for determining the presence of one or more radio frequency emitting sources (hereinafter referred to as RF sources) around a desired area by analyzing the power level of radio waves received by the movement detection antenna array within a selected frequency band (or within entire RF frequency spectrum) around the desired area. Further, the present invention provides for determining movement in the detected one or more RF sources based one or more techniques including visibility phase measurement and presence of spread power in spatial harmonics. The frequencies of the radio waves at which the movement of one or more RF sources is detected are identified. The detected frequencies are representative of the frequencies at which the one or more RF source is operating. Furthermore, a localization antenna subsystem is tuned to the identified frequencies one at a time to localize and identify the one or more RF sources. Yet further, the RF source is classified as an airborne source or ground-based source using radio interferometry imaging which maps the RF source in azimuth and elevation via localization antennas subsystem. Finally, on determination that the moving RF source is airborne, the interferometric images are further processed to confirm the type of airborne source by evaluating the velocity and acceleration, height; and angle of ascent or descent of the moving source.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention. The term desired area refers to the location from the one or more radio frequency emitting sources are to be detected.

The present invention would now be discussed in context of embodiments as illustrated in the accompanying drawings. FIG. 1 illustrates a detailed block diagram of a system for detecting, localizing and categorizing Unmanned Aerial Vehicles (UAVs), in accordance with an embodiment of the present invention. Referring to FIG. 1, in an embodiment of the present invention, an environment 100 for detecting, localizing and categorizing Unmanned Aerial Vehicles (UAVs), is illustrated. In various embodiments of the present invention, the environment 100 comprises one or more radio frequency emitting sources hereinafter referred to as RF sources 102 and a system for detecting, localizing and categorizing Unmanned Aerial Vehicles (UAVs), hereinafter referred to as drone detection system 104. The drone detection system 104 further comprises a movement detection antenna array 106, a localization antenna subsystem 108 and a computation subsystem 110.

In an embodiment of the present invention, the one or more RF sources 102 may include airborne sources such as an unmanned aerial vehicle (UAV), ground-based RF sources such as radio frequency emitters or any other source capable of emitting radio frequencies. In various embodiments of the present invention, the UAV is any aircraft capable of flying without a human pilot aboard and can be operated remotely. In an exemplary embodiment of the present invention, the UAV is a drone controlled via a ground based controller.

In various embodiments of the present invention, the movement detection antenna array 106, the localization antenna subsystem 108 and the computation subsystem 110 work in conjunction with each other for detecting, localizing and categorizing Unmanned Aerial Vehicles (UAVs).

In an embodiment of the present invention, the movement detection antenna array 106 is configured to receive radio waves having frequencies within the Radio frequency spectrum of 30 Hertz to 20 GHz from the one or more RF sources 102 or any other sources of interference around a desired area. In an exemplary embodiment of the present invention, the movement detection antenna array 106 is configured to receive radio waves within the frequency band ranging between 500 MHz and 6 GHz by scanning the desired area. In an embodiment of the present invention, the frequency band ranging between 500 MHz to 6 GHz is divided into two sub-bands. The frequency band ranging between 500 MHz to less than 1 GHz is referred to as a low frequency band and frequency band ranging from 1 GHz to 6 GHz is referred to as a high frequency band.

Figure 1A:
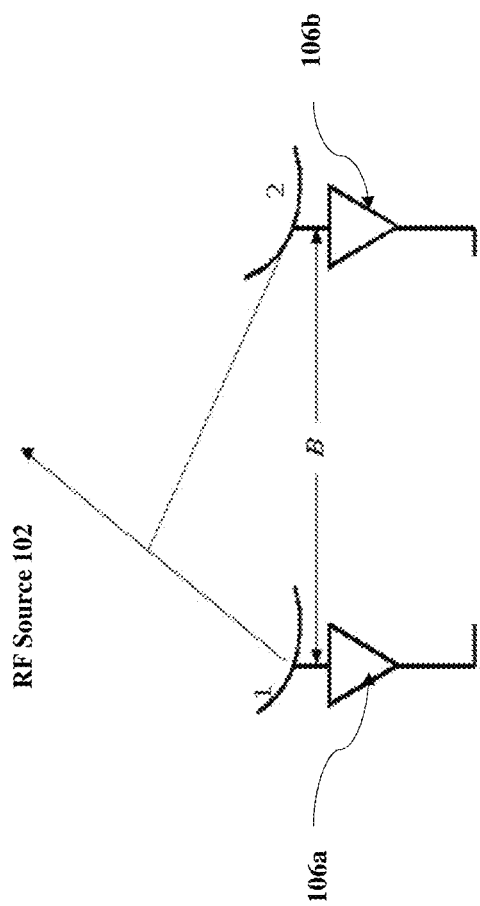
FIG. 1A is an exemplary configuration of the movement detection antenna array, in accordance with an embodiment of the present invention.
Figure 1B:
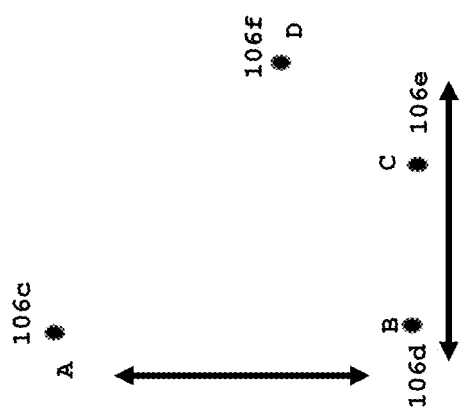
FIG. 1B is another exemplary configuration of the movement detection antenna array, in accordance with an embodiment of the present invention.

In various embodiments of the present invention, the movement detection antenna array 106 comprises two or more antennas (106a and 106b as shown in FIG. 1A; 106c, 106d, 106e and 106f as shown in FIG. 1B) separated by respective baseline distances. The baseline distance between the two or more antennas (106a and 106b as shown in FIG. 1A; 106c, 106d, 106e and 106f as shown in FIG. 1B) is evaluated based on the frequency and estimated speed of operation of the one or more RF sources such as a drone which are to be detected, desired distance from the movement detection antenna array 106 to first detect the RF source and required phase deviation. In an embodiment of the present invention, the height of two or more antennas (106a and 106b as shown in FIG. 1A; 106c, 106d, 106e and 106f as shown in FIG. 1B) ranges between 5 m-30 m. The height of the two or more antennas (106a and 106b as shown in FIG. 1A; 106c, 106d, 106e and 106f as shown in FIG. 1B) is computed based on the antenna type, effects of varying multipath and height of the surrounding structures. The two or more antennas (106a and 106b as shown in FIG. 1A; 106c, 106d, 106e and 106f as shown in FIG. 1B) may be selected from a group including, but not limited to, omni-directional antennas, directional antennas and spiral antennas. In an exemplary embodiment of the present invention, where the two or more antennas (106a and 106b as shown in FIG. 1A; 106c, 106d, 106e and 106f as shown in FIG. 1B) are spiral, the height of the two or more antennas may be selected from as low as 7 m to as high as 15 m based on the height of surrounding structures. In an exemplary embodiment of the present invention, the two or more antennas (106a and 106b as shown in FIG. 1A; 106c, 106d, 106e and 106f as shown in FIG. 1B) are combined directional antennas configured to generate 180×180 beamwidth to cover the upper hemisphere, the height of the two or more antennas may be selected from as low as 7 m to as high as 15 m.

In an embodiment of the present invention, as shown in FIG. 1A, the movement detection antenna array 106 comprises two antennas 106a and 106b having a height of 7 m and a baseline distance of 15-30 m. A 15 m baseline enables the computation subsystem 110 to detect a drone transmitting a frequency of 2.4 GHz at a velocity of greater than or equal to 4 m/s and flying at a distance of 1 km from the movement detection antenna array. The two or more antennas 106a and 106b are directional antennas combined to cover upper hemisphere in order to prevent varying multipath effects. The two antennas 106a and 106b interface with the computation subsystem 110 for transmitting sampled radio frequency (RF) signals extracted from the radio waves received within a selected frequency band or within entire RF frequency spectrum around the desired area.

In another embodiment of the present invention as shown in FIG. 1B, the movement detection antenna array comprises four antennas 106c, 106d, 106e and 106f. The antennas 106c, 106d, 106e and 106f are combined directional antennas having a height of 7 m from the ground. The positions of the antennas 106c, 106d, 106e and 106f in relation to each other are selected based on the respective baseline distances. The baseline distance (AB) between antennas 106c and 106d is 31 m approximately. The baseline distance (BC) between antennas 106d and 106e is 18 m. Further, the baseline distance (CD) between the antennas 106e and 106f is 18 m. The baseline (CD) between antennas 106e and 106f and the baseline BD between the antennas 106d and 106f can be projected in x direction and y direction respectively. As shown in FIG. 1B there are three baselines in the x direction: BC, projection of CD in x-direction and projection of BD in x-direction. Similarly, there are three baselines in the Y-direction: AB, projection of AD in y direction, and projection of BD in y-direction. In an exemplary embodiment of the present invention, the shorter baselines such as BC, projection of AD in y direction, projection of BD in y-direction, and projection of CD in x direction are configured for processing radio waves within high frequency band (1 GHz to 6 GHz). The longer baselines such as BC, projection of BD in x-direction, AB and projection of AD in y-direction are configured for processing radio waves within low frequency band (500 MHz to less than 1 GHz). It may be noted that BC and projection of AD in y-direction are common for both high frequency band (1 GHz to 6 GHz) and low frequency band (500 MHz to less than 1 GHz). The combination of baseline lengths prevents low phase deviation due to phase wraps even when the RF source 102 such as a drone flies at sufficient distance for the path difference to be detected. In particular, if the phase change is not sufficient for drone detection by one baseline length due to phase wraps, the phase change is detectable by the other baseline length. In an embodiment of the present invention, the baseline between two or more antennas are orthogonal baselines to enable RF source detection such as a drone in any direction.

The movement detection antenna array 106 interfaces with the computation subsystem 110 over a communication channel (not shown). In particular, the two or more antennas (106a and 106b as shown in FIG. 1A; 106c, 106d, 106e and 106f as shown in FIG. 1B) interfaces with the computation subsystem 110 over a communication channel (not shown). Examples of the communication channel may include, but are not limited to, a physical transmission medium, such as, a wire, or a logical connection over a multiplexed medium, such as, a radio frequency channel in telecommunications and a computer networking. Examples of computer networking may include, but are not limited to, a Local Area Network (LAN), a Metropolitan Area Network (MAN), and a Wide Area Network (WAN). In operation, in an exemplary embodiment of the present invention, the two or more antennas (106a and 106b as shown in FIG. 1A; 106c, 106d, 106e and 106f as shown in FIG. 1B) interface with the computation subsystem 110 via one or more software defined radio (SDR) devices (not shown) over the communication channel (not shown). In an embodiment of the present invention, as shown in FIG. 1B, the antennas 106c, 106d, 106e and 106f are connected to low noise amplifiers (LNAs) which further interfaces with one or more software defined radio (SDR) device. The SDR may be hardware or a software or combination of hardware and software. In another embodiment of the present invention, the SDR may be a part of the computation subsystem 110. The SDR acts as a data acquisition unit. The SDR is configured to process the radio waves received via the two or more antennas (106a and 106b as shown in FIG. 1A; 106c, 106d, 106e and 106f as shown in FIG. 1B) and relays the sampled radio frequency (RF) signals extracted from the radio waves to the computation subsystem 110 for further processing. In the exemplary embodiment of the present invention, the SDR (not shown) is a hardware device and interfaces with the computation subsystem 110 over an Ethernet connection. The SDR (not shown) comprises two or more channels. In an exemplary embodiment of the present invention, the SDR is a four channel SDR viz. USRP 2955 R. In an exemplary embodiment of the present invention, the SDR is configured to perform data acquisition. In particular, the SDR (not shown) performs signal sampling on RF signals carried by respective one or more radio waves and converts the analogue RF signals into digitized sampled RF signals. The SDR relays the sampled RF signals to the computation subsystem 110 for further processing. In the exemplary embodiment of the present invention, the SDR viz. USRP 2955 R has a tunable frequency range from 20 MHz upto 6 GHz. The SDR supports a simultaneous bandwidth of 160 MHz, thereby a single SDR can be configured to receive radio waves within a 160 MHz frequency band selected from 20 MHz to 6 GHz band via the two or more antennas around the desired area. Further, in the exemplary embodiment of the present invention, the maximum sampling rate is 100 million samples per second (Msps) per channel, thereby limiting the simultaneous bandwidth of the SDR upto 100 MHZ. In an exemplary embodiment of the present invention, the SDR is configured to 50 MHz step tuning and scanning to cover the entire 500 MHz to 6 GHz frequency band in steps of 50 MHz sub-bands. In another embodiment of the present invention, multiple SDRs are implemented to simultaneously cover the entire 20 MHz to 6 GHz frequency band.

Figure 1C:
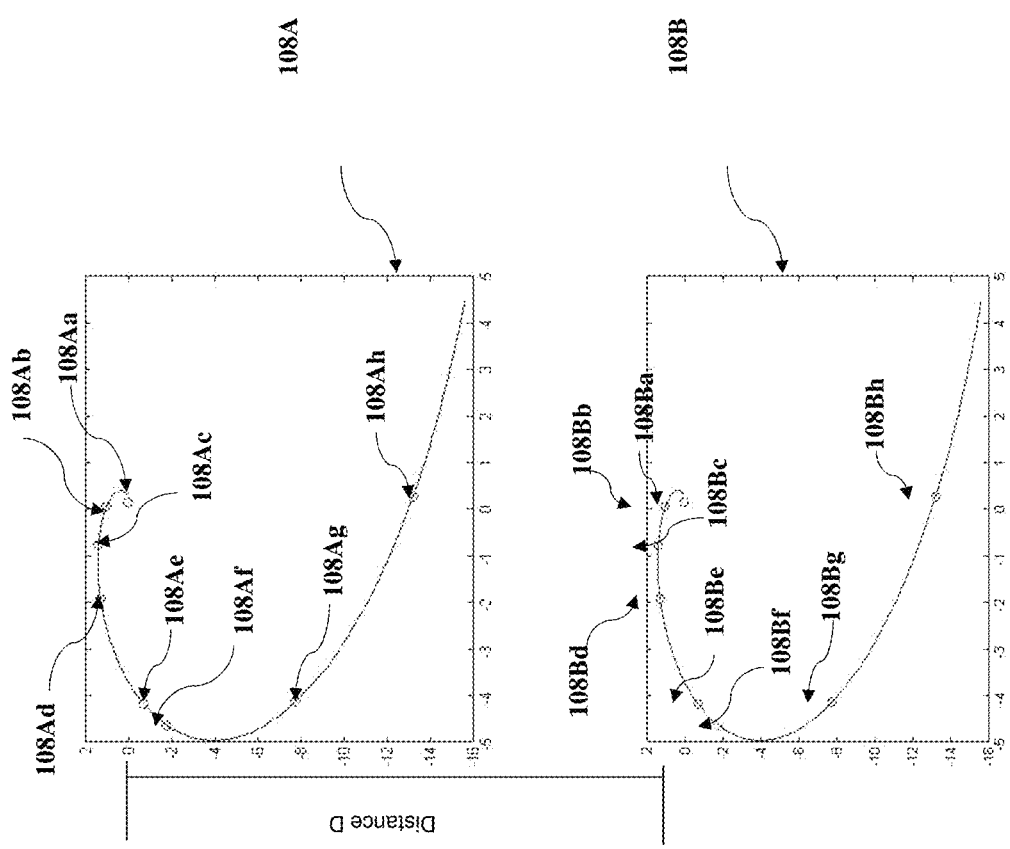
FIG. 1C is an exemplary configuration of the localization antenna subsystem, in accordance with an embodiment of the present invention.

In various embodiments of the invention, the localization antenna subsystem 108 comprises two or more sets of antenna arrays (108A and 108B as shown in FIG. 1C) configured to receive radio waves transmitted by the detected one or more RF sources 102 within the entire radio frequency spectrum (30 Hertz to 20 GHz). The localization antenna subsystem 108 is configured to relay the received radio waves to the computation subsystem 110 to perform interferometric imaging and processing as is described later in the specification. In an embodiment of the present invention as shown in FIG. 1C, the localization antenna subsystem 108 comprises two sets of antenna arrays (108A and 108B). Each of the antenna arrays (108A and 108B) are configured to receive radio waves within frequency band ranging from 500 MHz-6 GHz. Each of the two sets of antenna arrays (108A and 108B) are arranged in a log spiral configuration whose center is the center of Cartesian coordinate system. Further, the two sets antenna arrays (108A and 108B) are arranged such that the axes of the respective antenna arrays (108A and 108B) have a translation in Y direction with respect to each other and their X and Z axes are parallel. The spiral configuration of the two antennas arrays (108A and 108B) are separated by a certain distance in Y direction which is on the ground. The separation between the antenna arrays 108A and 108B is evaluated based on the maximum desired distance between the RF source and the two antenna arrays (108A and 108B) from which the images of the detected RF source are to be plotted. In an exemplary embodiment of the present invention, the separation between the antenna arrays 108A and 108B is evaluated as a minimum of ¼ of the desired distance between the RF source and the two antenna arrays (108A and 108B) from which the images of the detected RF source are to be plotted. In an exemplary embodiment of the present invention, the minimum desired distance between the RF source operating at 2.4 GHz and the two antenna arrays (108A and 108B) is approximately 35 m. For example—if images of an RF source at point P are to be plotted and the maximum distance from which the RF source at point P can be plotted (i.e. location of the localization antenna subsystem 108) is at point Q, then the separation D between the two antenna arrays (108A and 108B) is ¼ of PQ. It is to be understood that more separation provides better ability to distinguish between two images from respective antenna arrays (108A and 108B). The plotting of RF source images is described later in the specification.

In an exemplary embodiment of the present invention as shown in FIG. 1C, each of the two sets of antenna arrays (108A and 108B) comprises eight antennas (108Aa, 108Ab, 108Ac, 108Ad, 108Ae, 108Af, 108Ag, 108Ag and 108Ba, 108Bb, 108Bc, 108Bd, 108Be, 108Bf, 108Bg, 108Bg) respectively, arranged in a spiral configuration such that the baselines or separation between each of the successive antennas of respective antenna arrays are integer multiples of half the longest wavelength in the frequency band (500 MHz-6 GHz). The spiral configuration is selected as it generates minimum side lobes. In an exemplary embodiment of the present invention, the two or more antennas (108Aa, 108Ab, 108Ac, 108Ad, 108Ae, 108Af, 108Ag, 108Ag and 108Ba, 108Bb, 108Bc, 108Bd, 108Be, 108Bf, 108Bg, 108Bg) are combined directional antennas configured to generate 180×180 beamwidth to cover the upper hemisphere. In an exemplary embodiment of the present invention, for a frequency band ranging from 500 MHz to 6 GHz, the baseline distance is integer multiple of 30 cm which is half of the longest wavelength. In an exemplary embodiment of the present invention, the separation between each of the successive antennas (108Aa, 108Ab, 108Ac, 108Ad, 108Ae, 108Af, 108Ag, 108Ag and 108Ba, 108Bb, 108Bc, 108Bd, 108Be, 108Bf, 108Bg, 108Bg) in each array (108A and 108B) are integer multiples of half wavelength in the frequency band ranging from 500 MHz-6 GHz. The height of the localization subsystem 108, in particular the height of each of antennas associated with the localization antennas subsystem 108 is selected based on the height of surrounding structures in order to get clear view of the sky.

In an embodiment of the present invention, the localization antenna subsystem 108 interfaces with the computation subsystem 110 over a communication channel (not shown). In particular, the two or more sets of antenna arrays (108A and 108B as shown in FIG. 1C) interfaces with the computation subsystem 110 over a communication channel (not shown). Examples of the communication channel may include, but are not limited to, a physical transmission medium, such as, wires or cables, a logical connection over a multiplexed medium, such as, a radio frequency channel in telecommunications and computer networking. Examples of computer networking may include, but are not limited to, a Local Area Network (LAN), a Metropolitan Area Network (MAN), and a Wide Area Network (WAN). In operation, in an exemplary embodiment of the present invention, where each of the antenna array (108A and 108B) comprises eight antennas, each antenna interfaces with the computational subsystem 110 via one or more software defined radio (SDR) devices (not shown) over the communication channel (not shown). In particular each antenna array (108A and 108B) interfaces with two SDRs each, via physical transmission medium such as coaxial cables, where each SDR has four channels. Further, each SDR interfaces with the computation subsystem 110 over logical connection such as Ethernet. Respective channels of each SDR are connected with respective antennas, i.e. one channel of SDR is allocated to one antenna. The four SDRs are synchronized in phase to obtain correct results. As already explained in relation to movement detection antenna array 106, the SDRs are configured to process the radio waves received via the eight antennas (108Aa, 108Ab, 108Ac, 108Ad, 108Ae, 108Af, 108Ag, 108Ag and 108Ba, 108Bb, 108Bc, 108Bd, 108Be, 108Bf, 108Bg, 108Bg) and relays the sampled radio frequency (RF) signals extracted from the radio waves to the computation subsystem 110 for further processing.

In various embodiments of the present invention, the computation subsystem 110 is configured to interface with the movement detection antenna array 106 and the localization antenna subsystem 108 over one or more communication channels as already exemplified in the specification. The computation subsystem 110 interfaces with the movement detection antenna array 106 to receive radio waves within a selected frequency band or the entire radio frequency spectrum around a desired area to detect the presence of one or more RF sources 102 and determine movement in the detected one or more RF sources 102. The computation subsystem 110 interfaces with the localization antenna subsystem 108 to classify the detected one or more RF sources into ground-based or airborne category and identify the type of RF source.

In various embodiments of the present invention, the computation subsystem 110 may be a hardware, a combination of hardware and software, or a computer implementable software. In an embodiment of the present invention, the computation subsystem 110 may be implemented as a client-server architecture, wherein a client terminal device (not shown) accesses a server hosting the computation subsystem 110 over a communication channel (not shown). In another embodiment of the present invention, the computation subsystem 110 may be implemented in a cloud computing architecture in which data, applications, services, and other resources are stored and delivered through shared data-centers. In an exemplary embodiment of the present invention, the functionalities of the computation subsystem 110 are delivered as software as a service (SAAS).

In an embodiment of the present invention, as shown in FIG. 1, the computation subsystem 110 comprises a drone detection engine 112, a processor 114, a memory 116 and an Input/output (I/O) terminal device 118. The drone detection engine 112 is operated via the processor 114 specifically programmed to execute instructions stored in the memory 116 for executing functionalities of the computation subsystem 110 in accordance with various embodiments of the present invention.

In various exemplary embodiments of the present invention, the input/output (I/O) terminal device 118 may include, but is not limited to, a touchscreen display, a keyboard and a display combination or any other wired or wireless device capable of receiving inputs and displaying output results.

In various embodiments of the present invention, the drone detection engine 112 is configured to receive one or more radio waves within a selected frequency band around a desired area to detect the presence of one or more RF sources 102. The drone detection engine is configured to determine movement in the detected one or more RF sources 102. Further, the drone detection engine 112 is configured to classify the one or more RF sources into ground-based or airborne category and identify the type of RF source based on velocity, acceleration, height, and angle of ascent or descent of the RF source. In various embodiments of the present invention, the drone detection engine 112 has multiple units which work in conjunction with each other for detecting, localizing and identifying Unmanned Aerial Vehicle (UAV) such as a drone around the desired area. The various units of the drone detection engine 112 are operated via the processor 114 specifically programmed to execute instructions stored in the memory 116 for executing respective functionalities of the multiple units in accordance with various embodiments of the present invention. In an embodiment of the present invention, the drone detection engine 112 comprises a channelization and source detection unit 120, a movement detection unit 122, and a localization and identification unit 124.

In operation in an embodiment of the present invention, the channelization and source detection unit 120 is configured to receive one or more radio waves within a selected frequency band via respective antennas (106a and 106b as shown in FIG. 1A; 106c, 106d, 106e and 106f as shown in FIG. 1B) of the movement detection antenna array 106. Further, the channelization and source detection unit 120 is configured to process the received radio waves to determine the presence of one or more RF sources emitting within the selected frequency band around the desired area. The frequency band may be selected based on the desired simultaneous bandwidth and processing speed of the processor 114. For e.g.: a frequency band of 500 MHz-6 GHz may be covered simultaneously or in steps of 50 MHz sub-bands. In an exemplary embodiment of the present invention, where a physical SDR is not implemented, the channelization and source detection unit 120 is configured to perform signal sampling on the RF signals carried by respective one or more radio waves and convert the analogue RF signals into digitized sampled RF signals. Further, the channelization and source detection unit 120 is configured to channelize the selected frequency band into desired smaller frequency bands for simultaneous or sequential processing.

In an exemplary embodiment of the present invention where one or more SDRs are implemented, the channelization and source detection unit 120 is configured to receive digitized sampled RF signals associated with respective radio waves within the selected frequency band via the one or more SDRs (not shown). In the exemplary embodiment, the frequency band selection is based on the simultaneous bandwidth of the SDRs, the number of SDRs and processing speed of the processor 114. In an exemplary embodiment of the present invention as shown in FIG. 1B, a single SDR viz. USRP 2955 R having a tunable frequency range from 20 MHz upto 6 GHz is implemented. The SDR (not shown) supports a simultaneous bandwidth of 160 MHz, thereby a single SDR can be configured to receive radio waves within a 160 MHz frequency band selected from 20 MHz to 6 GHz band via the two or more antennas (106a and 106b as shown in FIG. 1A; 106c, 106d, 106e and 106f as shown in FIG. 1B) around the desired area. The SDR (not shown) is configured to step tuning and scanning in order to cover the entire 500 MHz to 6 GHz frequency band in steps of 50 MHz sub-bands. For example: the SDR will sequentially tune to frequencies ranging from 500-550 MHZ, 550-600 MHz . . . 5.95 GHz-6.0 GHz in steps of 50 MHz to receive radio waves via the four antennas (106c, 106d, 106e and 106f as shown in FIG. 1B). In an exemplary embodiment of the present invention with reference to FIG. 1B, where the SDR (not shown) is implemented, the channelization and source detection unit 120 is configured to channelize each of the 50 MHz channels of the SDR allocated to respective four antennas (106c, 106d, 106e and 106f as shown in FIG. 1B) into ten, 5 MHz sub-channels. Each of the ten, 5 MHz sub-channels associated with a 50 MHz channel receives 5 million (5 e6) samples of RF signal received by corresponding antenna. The channelization and source detection unit 120 is configured to simultaneously stream the 200K samples received from each of the 10 channels to detect the presence of one or more RF sources in the first ten, 5 MHz sub-channels of 50 MHz simultaneous bandwidth associated with a frequency band such as 500-550 MHZ and repeat the detection process for each of the step tuned frequency band upto 5.95 GHz-6.0 GHz. In particular, the channelization and source detection unit 120 performs a check to determine if the power level of each set of 200K samples is greater than a predetermined threshold (P). A power level greater than the threshold is indicative of the presence of a RF source. Subsequently, the channelization and source detection unit 120 streams 5M samples associated with RF signals received by respective antennas (106c, 106d, 106e and 106f as shown in FIG. 1B) from each of the 10, 5 MHz channels, where the presence of RF source is detected. The streamed samples are relayed to the movement detection unit 122 for further processing. It is to be understood that the various embodiments of the present invention are not limited to the parameters such as the number of SDRs, the SDR's bandwidth, no of channels, frequency step and sampling rate. The aforementioned parameters can be customized as per user requirement.

In an embodiment of the present invention, the movement detection unit 122 is configured to receive the channelized samples of the RF signals received by respective antennas (106c, 106d, 106e and 106f as shown in FIG. 1B). In an exemplary embodiment of the present invention as described above, the movement detection unit 122 receives 5M samples (5e6) from each of the ten, 5 MHz sub-channels, where the presence of RF source is detected. The movement detection unit 122 processes 5M samples (5e6) from respective channels to identify the frequencies at which the samples are acquired by the respective antennas (106c, 106d, 106e and 106f as shown in FIG. 1B) from the detected one or more RF source 102. In particular, the movement detection unit 122 identifies the frequencies of the radio waves acquired by the respective antennas (106c, 106d, 106e and 106f as shown in FIG. 1B) from the detected one or more RF source 102. The identified frequencies are representative of the frequencies at which the detected one or more RF source 102 is operating.

The movement detection unit 120 further processes the 5M samples (5e6) from respective sub-channels to determine the movement in the detected one or more RF source 102 using one or more techniques as described later. The movement detection unit 120 repeats the processing for other set of sub-channels associated with subsequent 50 MHz frequency bands up to the maximum frequency band for e.g.: 5.95 GHz-6 GHz. In an embodiment of the present invention, the movement detection unit 122 is configured to process 5e6 samples from all the ten sub-channels simultaneously. In various embodiments of the present invention, the one or more techniques may include, but are not limited to, visibility phase measurement as a function of time and determination of spread power in spatial harmonics.

In an embodiment of the present invention, the technique of visibility phase measurement as a function of time includes receiving radio waves from the detected RF source 102 via the two or more antennas (106a and 106b as shown in FIG. 1A; 106c, 106d, 106e and 106f as shown in FIG. 1B) of the movement detection antenna array 106. In an embodiment of the present invention, the radio waves are captured at a center frequency of the selected frequency band to get the visibility, which is complex. The visibility is the cross power measured by the two antennas. In particular the phase of the visibility is a measure of the path difference of the detected source from the two or more antennas (106a and 106b as shown in FIG. 1A; 106c, 106d, 106e and 106f as shown in FIG. 1B) Therefore, any movement in the source, changes the path difference, further leading to a change in the phase difference. Similarly, for a stationary source the path difference, and hence the phase difference remains constant with time. Thus measuring the visibility phase as a function of time determines whether the RF source is moving or stationary.

In an embodiment of the present invention, an efficient phase change per unit time to detect the motion of the source is dependent on the baseline lengths between the two or more antennas (106a and 106b as shown in FIG. 1A; 106c, 106d, 106e and 106f as shown in FIG. 1B). In operation, in an exemplary embodiment of the present invention, as shown in FIG. 1B, the movement detection unit 122 is configured to process 5e6 samples received from respective channels associated with corresponding antennas (106c, 106d, 106e and 106f as shown in FIG. 1B) based on the identified frequency of radio waves as discussed in para 39. In an exemplary embodiment of the present invention, as shown in FIG. 1B, the movement detection unit 122 is configured to process shorter baselines for radio waves within high frequency band (1 GHz to 6 GHz) and longer baselines for radio waves within low frequency band (500 MHz to less than 1 GHz). The movement detection unit 122 divides each chunk of 5e6 samples received from respective ten, 5 MHz sub-channels associated with each of the antennas into 5000 smaller chunks, each having 1000 continuous samples. Further, for each baseline (for eg: AB of FIG. 1B depending on the frequency band) formed by corresponding two antennas (106c and 106d) and for respective first channels associated with said antennas (106c and 106d), the movement detection unit 122 divides a chunk of 5e6 samples received from first channel associated with one antenna and another chunk of 5e6 samples received from first channel associated with second antenna into two 5000 smaller chunks, each having 1000 samples. Further, a cross power is computed by multiplying Fast Fourier Transform (FFT) of 1000 samples from one channel with complex conjugate of (FFT) of 1000 samples of another channel from which 5000 chunks of cross-power each having 1000 samples are obtained. Further, an average of 1000 successive chunks each having 1000 samples is computed and 5 cross-power chunks of 1000 samples are obtained as a result. Further, an angle average of 1000 samples for each of the 5 chunks is computed and 5 values are obtained. Further, the maximum-minimum of these 5 values representing phase deviation of the visibility function of a baseline is obtained for 1 s. The above step is repeated for each of the ten, 5 MHz channels associated with antennas (106c and 106d of FIG. 1B) to obtain ten phase deviations of the visibility function of a baseline in 1 s for respective 10 channels. The step of obtaining phase deviation of the visibility function is repeated for each baseline formed by corresponding antennas (106c, 106d, 106e and 106f of FIG. 1B). Further, the movement detection unit 122, performs a check to determine if the obtained phase deviation of the visibility function of any of the baselines is greater than a predetermined threshold. The value of phase deviation of any of the baseline greater than the threshold is representative of a movement in the detected RF source. In the exemplary embodiment of the present invention as shown in FIG. 1B, the movement detection unit 122, is configured to measure a phase change for radio waves frequencies within 500 MHz to 6 GHz. In the exemplary embodiment of the present invention, a phase deviation for radio waves received from a RF source operating at 2.4 GHz frequency is computed to be greater than a predetermined threshold of 1.5 rad, when the RF source is flying. The predetermined threshold value is computed based on the desired maximum distance between the RF source and the antennas of the movement detection antenna array 106 from which RF source is to be detected, the speed at which the RF source is moving and the baseline lengths and varying multipath.

In an embodiment of the present invention, the determination of spread power in spatial harmonics is indicative that the detected RF source is moving. In general, visibility of any particular radio wave frequency received from the RF source such as a drone has an amplitude and phase constant with time and space when the RF source is stationary, as observed at the two or more antennas of the movement detection antenna array 106. Therefore, isolating the received visibility frequencies in the band after computing Fast Fourier Transform (FFT) and obtaining the amplitude and phase value of each of visibility frequency and plotting the amplitude and phase of the visibility as a function of time, the amplitude and phase of the visibility for any frequency remains constant with time within the limit of noise fluctuations. However, the amplitude and phase of the visibility for any frequency as observed at the two or more antennas of movement detection antenna array varies with time and space if the RF source is moving. Therefore, computing a Fourier transform of the frequencies in the FFT domain as a function of time, gives power that is not concentrated at 0 frequency but is spread among the harmonics.

In an exemplary embodiment of the present invention with reference to FIG. 1B, the movement detection unit 122 is configured to process short baselines for radio waves within high frequency band (1 GHz to 6 GHz) and long baselines for radio waves within low frequency band (500 MHz to less than 1 GHz). The movement detection unit 122 divides each chunk of 5e6 samples received from respective ten, 5 MHz sub-channels associated with each of the two antennas (106c, 106d, 106e and 106f as shown in FIG. 1B) forming a baseline into 5000 smaller chunks, each having 1000 continuous samples. Further, for each baseline (for eg: AB of FIG. 1B depending on the frequency band) formed by corresponding two antennas (106c and 106d) and for respective first channels associated with said antennas (106c and 106d), the movement detection unit 122 divides a chunk of 5e6 samples received from first sub-channel associated with one antenna and another chunk of 5e6 samples received from first sub-channel associated with second antenna into two 5000 smaller chunks, each having 1000 samples. A cross power is computed by multiplying FFT of 1000 samples from one sub-channel with complex conjugate of FFT of 1000 samples of another sub-channel from which 5000 chunks of cross-power each having 1000 samples are obtained. Further FFT is performed in vertical direction of the matrix, implying FFT of (5000×FFT of (1000)) to obtain the spatial frequency distribution for all frequencies in the 5 MHz sub-channel associated with antennas (106c and 106d of FIG. 1B) for a frequency band of for e.g.: 500 MHz-550 GHz. The above step is repeated for each of the ten, 5 MHz channels associated with antennas (106c and 106d of FIG. 1B). Further, the above step is repeated for each of the ten, 5 MHz channels associated with other antenna baselines depending on the frequency band. The same procedure is repeated for all the ten, 5 MHz channels of other frequency bands 550-600 MHz, 600-650 MHz up to 5.95-6 GHz.

Figure 1D:
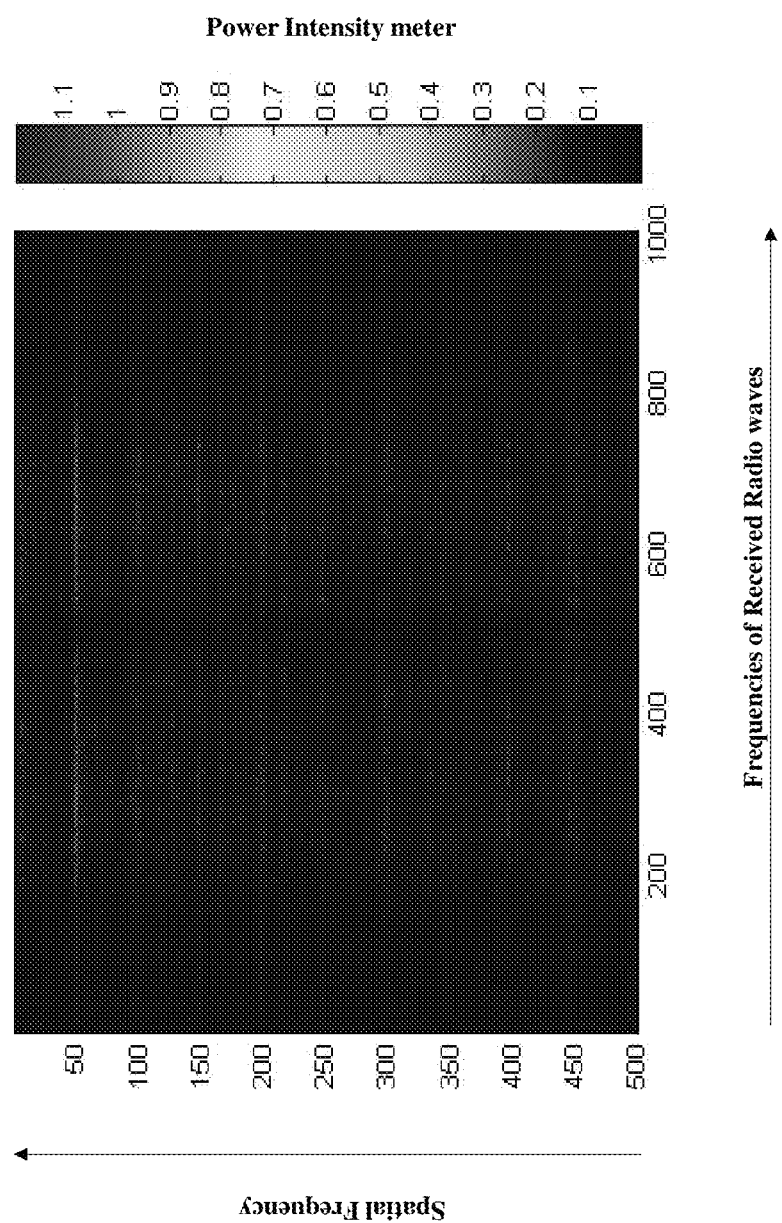
FIG. 1D illustrates a plot between frequencies of radio waves received by a movement detection antenna array and spatial frequencies for a stationary RF source, in accordance with an embodiment of the present invention.
Figure 1E:
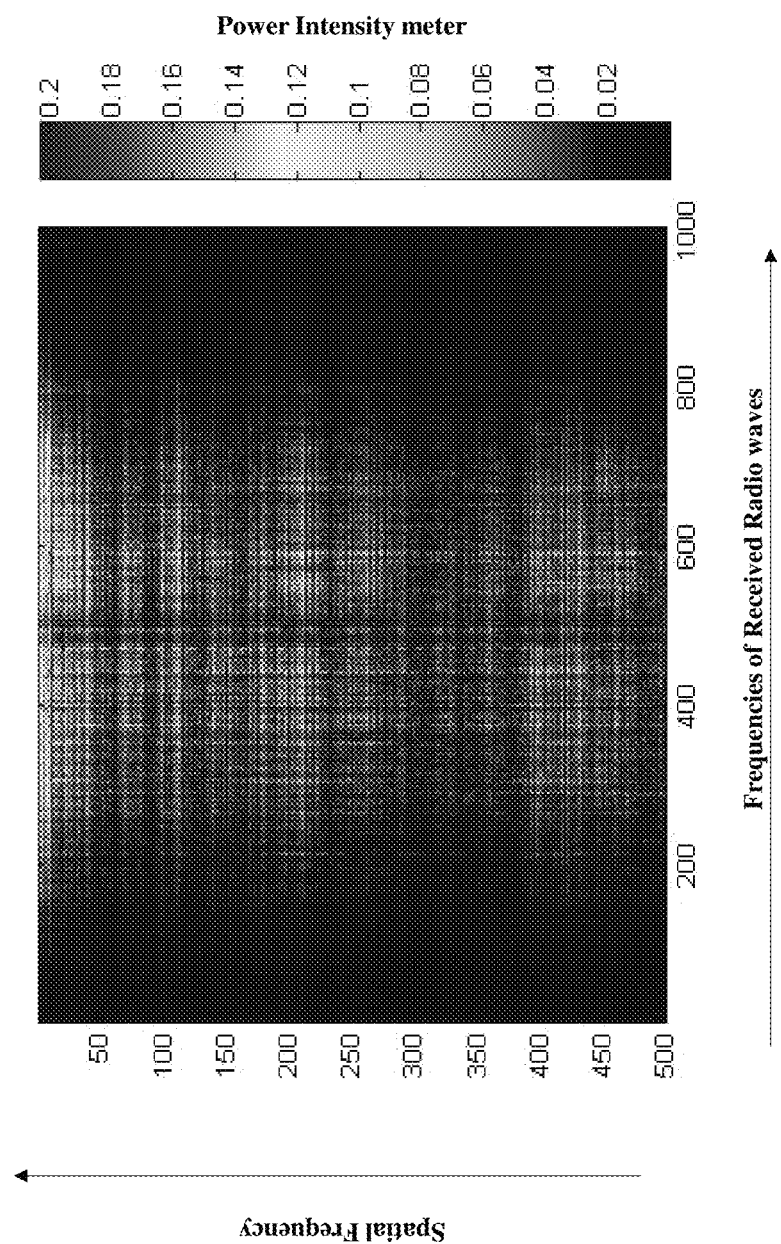
FIG. 1E illustrates a plot between frequencies of radio waves received by a movement detection antenna array and spatial frequencies for a moving RF source, in accordance with an embodiment of the present invention.

Referring to FIG. 1D and FIG. 1E, a plot between the frequencies of the radio waves received by the movement detection antenna array and spatial frequencies is shown. As shown in FIG. 1D for a stationary RF source such as a drone, the power is concentrated at 0 frequency as the amplitude and phase of visibility remains constant as observed at the two or more antennas associated with the movement detection antenna array 106 with time. The ratio of the power at 0 spatial frequency to that of the other spatial frequencies is found to be greater than 15 units which indicates power is concentrated at 0 frequency. The power or amplitude spread across harmonics is represented by bright lines. Referring to FIG. 1D, there are no visible bright lines as a function of spatial frequency indicating the power is concentrated at 0 frequency and the RF source is stationary. As shown in FIG. 1E the power is spread over harmonics when the RF source is moving and the ratio of the power at 0 spatial frequency to that of the other spatial frequencies is found to be less than 6 units in each event of data collection indicating the power is spread among the harmonics of the spatial frequency. Referring to FIG. 1E, there are visible bright lines spread over spatial frequencies indicating spread in power or amplitude of radio waves over spatial frequencies. The visible bright lines are represented by green color and indicate that the RF source is moving. As shown in FIG. 1E, the spacing between the harmonics varies as the speed of the RF source is not constant. The spacing between the harmonics depends on the baseline length changes per unit time of sampled data. If the RF source such as a drone moves fast the baseline length for the RF source changes fast and hence the harmonics are widely spaced. Similarly, if the RF source such as a drone moves slower, the harmonics are more closely spaced. Also the spacing among the harmonics depends on the baseline length. More the baseline length, higher is the rate of change of amplitude and phase of visibility per unit sampling time as observed at the two or more antennas of the movement detection antenna array.

In various embodiments of the present invention, the localization and identification unit 124 is configured to receive the identified frequencies of the radio waves at which the detected one or more RF source 102 is operating (as described in para 39 of the specification) from the movement detection unit 122. The localization and identification unit 124 is configured to tune the localization antenna subsystem 108 to the detected frequencies one at a time. For e.g.: in a band of 500-550 MHZ, if the frequency of RF source is detected as 512 MHz, the localization antenna subsystem is tuned to 512 MHz via the localization and identification unit 124. In an exemplary embodiment of the present invention, the localization and identification unit 124 is configured to generate two images of the detected RF source. As already described in the specification, the localization antenna subsystem 108 comprises two arrays of 8 antennas each and total of 28 baselines per antenna array. A visibility measurement for each baseline is evaluated using the equation: $V(u,v)$ F.T $I(l,m)$; where F.T means a 2D Fourier transform; $V(u,v)$ is the visibility as a function of u and v and $I(l,m)$ is the intensity as a function of direction cosines l and m. In various embodiments of the present invention, u, v, l and m are integers. In operation, the localization and identification unit 124 measures 28 visibilities for each set of antenna arrays. Further, a UV grid is formed for each set of antenna array, where the center of the UV grid is the origin of a UV plane, where all baselines lengths in wavelengths are plotted with one end of baseline at origin. In an exemplary embodiment of the present invention, the UV grid is a matrix of 1000×1000 elements. All elements are initially assigned the value zero, and subsequently visibility measurement in the location of baseline is plotted in the grid. In an exemplary embodiment of the present invention, location of the baseline is $(X2-X1)/$wavelength$/2)$, $(Y2-Y1)/$wavelength$/2)$ where X1, Y1, X2, Y2 are the coordinates of respective antennas forming the baseline. In the exemplary embodiment of the present invention, 28 visibilities for 28 baselines corresponding to a set of antenna array are measured. All the baselines are plotted on the UV grid and corresponding visibility values are put in the corresponding baseline locations. Further, inverse sign of the baseline coordinates is selected as locations in the grid and a conjugate of corresponding visibilities is set to those locations. In an exemplary embodiment of the present invention, a 2D FFT of the respective UV grids is computed and two images are obtained respectively. Each of the images comprises bright spots, where the bright spots are representative of RF sources in the respective images.

The localization and identification unit 124 is configured to determine if the received radio waves are from the same source or from a different source. In operation, the localization and identification unit 124 is configured to determine if the bright spots in each of the two images are from the same RF source. As already discussed there is translation in Y axis for the two antenna subsystems (108A and 108B as shown in FIG. 1C) configured in log-spiral, therefore the localization and identification unit 124 analyses each of the two images to identify if there is an axis value common for both the images. The axis value is discussed later in the specification. In a particular embodiment of the present invention, the common axis value is indicative that the bright spots in the two images are from the same RF source. In particular in an exemplary embodiment of the present invention as already described above, the localization antenna subsystem 108 comprises a pair of antenna arrays arranged in log-spiral configuration, each comprising 8 antennas and the two sets of 8 antennas are arranged in such a way that their axes have a translation in Y direction with respect to each other and their X and Z axes are parallel. Each of the two images have l, m axes where l and m are the direction cosines with respect to the zenith, which is the center of the image. Both l and m have respective axis values for respective images. Presence of translation only in Y direction is indicative that one of the direction cosines of l or m have same value at any instant of time in the two images for the common bright spot. For e.g.: at one instant of time the direction cosines of l may have a value 2 in both the images, similarly in another instant of time the direction cosines of l may have a value 3 in both the images.

Figure 1F:
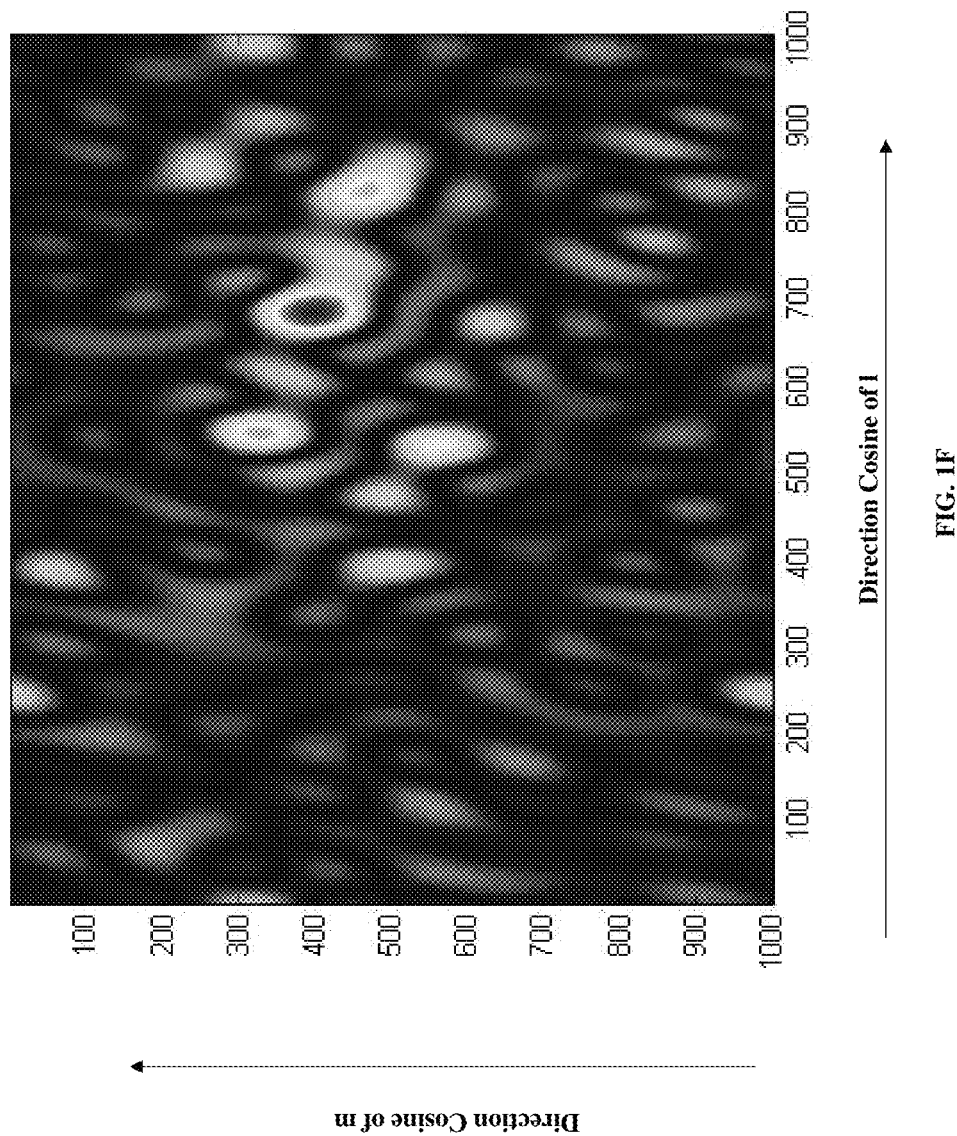
FIG. 1F illustrates the image obtained from one of the two sets of antenna arrays, in accordance with an embodiment of the present invention.
Figure 1G:
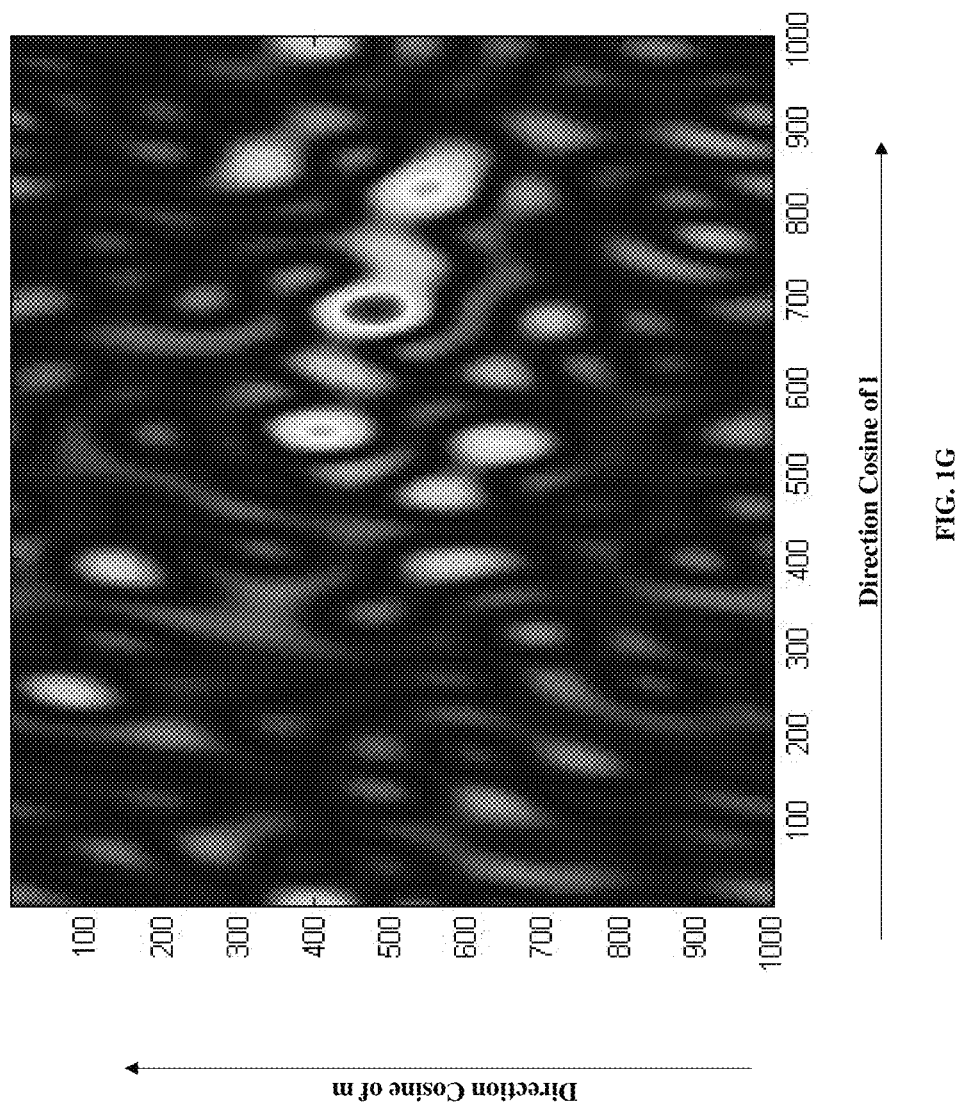
FIG. 1G illustrates the image obtained from another of the two sets of antenna arrays, in accordance with an embodiment of the present invention.

Referring to FIG. 1F the image obtained from one of the two sets of antenna arrays is shown. Referring to FIG. 1G the image obtained from another of the two sets of antenna arrays is shown. The images shown in FIGS. 1F and 1G are a plot between the direction cosine l on the x-axis and direction cosine m on the y-axis. The images shown in FIGS. 1F and 1G are obtained by translating only the Y axis with respect to each other. In an embodiment of the present invention, a horizontal line through the center is representative of l axis and a vertical line through the center is representative of m axis. As can be seen from FIGS. 1F and 1G, m is different for the bright spot and l has same value at an instant of time, indicating that the bright spots are generated by the same RF source. It is to be understood, that X and Y have are different from l and m. As stated previously, l and m are direction cosines whereas X and Y are Cartesian coordinates. If the bright spots are from the same RF source, the two directions of RF source from the centers of two coordinate systems are further evaluated from the two obtained images. The exact location of the RF source is evaluated from the two directions from where they intersect in space.

The localization and identification unit 124 classifies the detected one or more RF source 102 as airborne source or ground-based source using radio interferometry imaging via the localization antenna subsystem 108. In particular, the localization and identification unit 124 maps the detected RF source in azimuth and elevation. The map represents all the interfering sources and the actual RF source as points as a function of azimuth and elevation. Finally, on determination that the moving RF source is airborne, the localization and identification unit 124 further processes the interferometric images to confirm the type of airborne source. In particular, the localization and identification unit 124 evaluates the velocity and acceleration of the moving source based on movement of the RF source in space. Further, the localization and identification unit 124 analyses the velocity and the height at which the RF source flies to identify if the RF source is drone or some other UAV. In general a drones flies lower than fixed-wing aircraft. Additionally, the localization and identification unit 124 is configured to analyze the angle of ascent or decent of the RF source. The angle of ascent or decent of the RF source is computed during localization. A steep angle is indicative of a drone and other angle may indicate other UAVs or aircraft.

A map showing exact location, type, speed along with other parameters associated with the UAV are relayed to the I/O terminal device 118 to notify the users in the desired area.

In an experimental setup two vert 2450 omnidirectional antennas were used. The two antennas were separated using cables between the antenna ports and the SDR ports to prevent mutual coupling between antennas. A baseline distance of 4 m was maintained and the drone DJI MAVIC was flown using the DGI GO 4 application on a smart phone as well as an RC controller of the drone. It was assumed that smart phone or the controller will be further away from the receiver as compared to the drone as otherwise the smart phone transmission would dominate. Additionally, this was a fair assumption, as in a normal case the controller would be farther away from the receiver as compared to drone. A Wifi analyser application was used to determine the frequency of the drone to which the SDR was tuned. SDR was tuned to frequencies ranging from 2412 MHz to 2484 MHz sequentially in steps of 5 MHz. In the final implementation the Wifi analyzer app was removed and frequency band was scanned to identify power above a certain threshold to detect transmission and then that channel was tuned for detection. A phase difference deviation greater than 1.5 radian was detected for moving drone and any limit less than 1.5 radian was considered for stationary drones.

Figure 2:
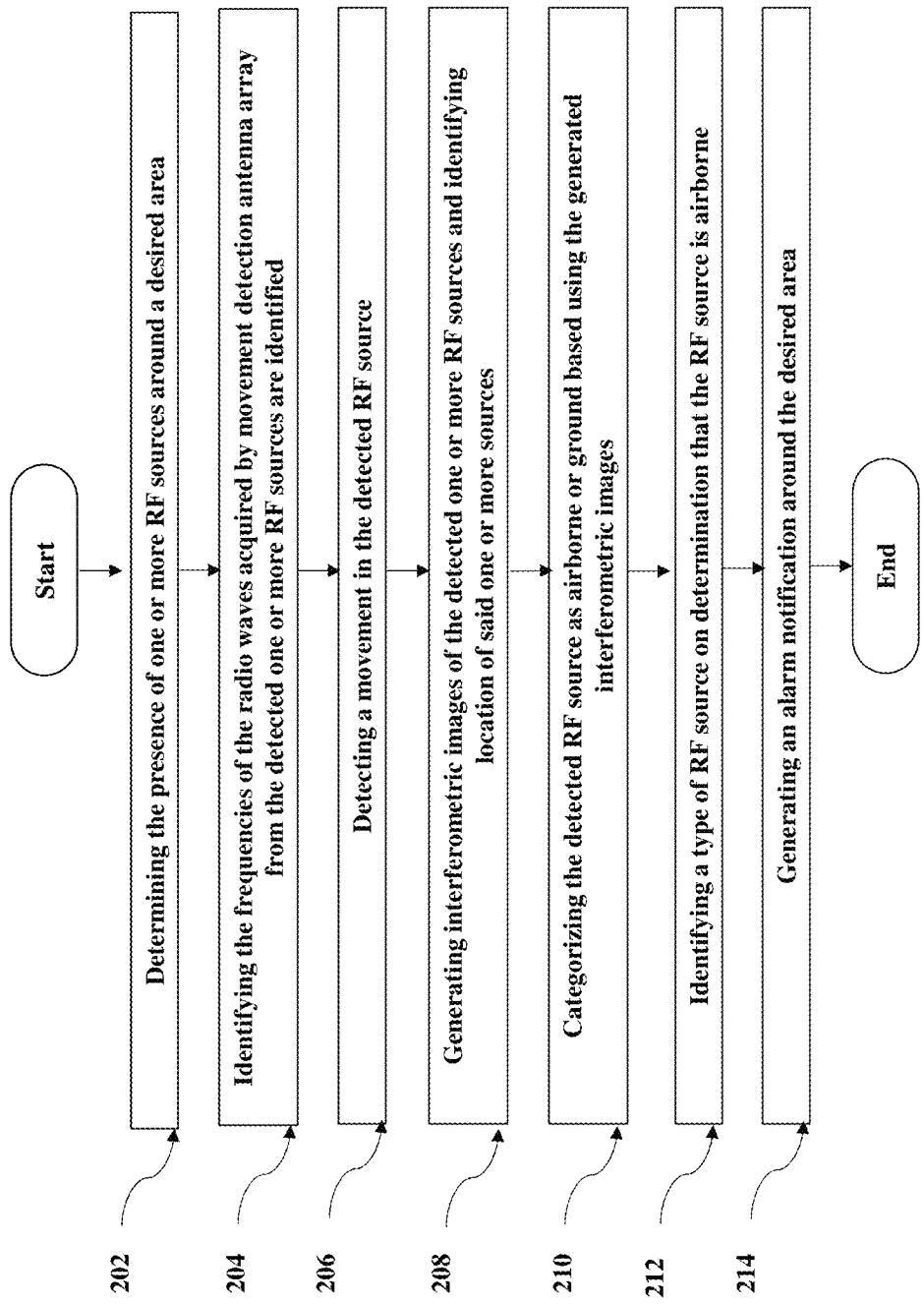
FIG. 2 is a flowchart illustrating a method for detecting, localizing and categorizing Unmanned Aerial Vehicles (UAVs), in accordance with an embodiment of the present invention.

FIG. 2 is a flowchart illustrating a method for detecting, localizing and categorizing Unmanned Aerial Vehicles (UAVs), in accordance with an embodiment of the present invention.

At step 202, presence of one or more radio frequency emitting sources hereinafter referred to as RF sources is determined around a desired area. In operation in an embodiment of the present invention, one or more radio waves within a selected frequency band are received via respective antennas (106a and 106b as shown in FIG. 1A; 106c, 106d, 106e and 106f as shown in FIG. 1B) of a movement detection antenna array 106 (FIG. 1). The received radio waves are processed to determine the presence of one or more RF sources emitting within the selected frequency band around the desired area. The frequency band may be selected based on the desired simultaneous bandwidth and processing speed of a processor. For e.g.: a frequency band of 500 MHz-6 GHz may be covered simultaneously or in steps of 50 MHz sub-bands. In an exemplary embodiment of the present invention, the RF signals carried by respective one or more radio waves are sampled and the analogue RF signals are converted into digitized sampled RF signals. Further, the selected frequency band is channelized into desired smaller frequency bands for simultaneous or sequential processing. In an exemplary embodiment of the present invention, one or more SDRs are implemented with the movement detection antenna array 106 of FIG. 1 and digitized sampled RF signals associated with respective radio waves within the selected frequency band are received via the one or more SDRs. In the exemplary embodiment, the frequency band selection is based on the simultaneous bandwidth of the SDRs, the number of SDRs and processing speed of the processor. In an exemplary embodiment of the present invention as shown in FIG. 1B, a single SDR viz. USRP 2955 R having a tunable frequency range from 20 MHz upto 6 GHz is implemented. The SDR (not shown) supports a simultaneous bandwidth of 160 MHz, thereby a single SDR can be configured to receive radio waves within a 160 MHz frequency band selected from 20 MHz to 6 GHz band via the two or more antennas (106a and 106b as shown in FIG. 1A; 106c, 106d, 106e and 106f as shown in FIG. 1B) around the desired area. The SDR (not shown) is configured to step tuning and scanning in order to cover the entire 500 MHz to 6 GHz frequency band in steps of 50 MHz sub-bands. For example: the SDR will sequentially tune to frequencies ranging from 500-550 MHZ, 550-600 MHz . . . 5.95 GHz-6.0 GHz in steps of 50 MHz to receive radio waves via the four antennas (106c, 106d, 106e and 106f as shown in FIG. 1B). In an exemplary embodiment of the present invention with reference to FIG. 1B, where the SDR is implemented, each of the 50 MHz channels of the SDR allocated to respective four antennas (106c, 106d, 106e and 106f as shown in FIG. 1B) are channelized into ten, 5 MHz sub-channels. Each of the ten, 5 MHz sub-channels associated with a 50 MHz channel receives 5 million (5e6) samples of RF signal received by corresponding antenna. 200K samples received from each of the 10 channels are streamed to detect the presence of one or more RF sources in the first ten, 5 MHz sub-channels of 50 MHz simultaneous bandwidth associated with a frequency band such as 500-550 MHZ and the detection process is repeated for each of the step tuned frequency band up to 5.95 GHz-6.0 GHz. A check is performed to determine if the power level of each set of 200K samples is greater than a predetermined threshold (P). A power level greater than the threshold is indicative of the presence of a RF source. Subsequently, 5M samples associated with RF signals received by respective antennas (106c, 106d, 106e and 106f as shown in FIG. 1B) from each of the 10, 5 MHz channels are streamed, where the presence of RF source is detected. It is to be understood that the various embodiments of the present invention are not limited to the parameters such as the number of SDRs, the SDR's bandwidth, no of channels, frequency step and sampling rate. The aforementioned parameters can be customized as per user requirement.

At step 204, the frequencies of the radio waves acquired by the movement detection antenna array (106 of FIG. 1) from the detected one or more RF sources are identified. In an embodiment of the present invention, the channelized samples of the RF signals received by respective antennas (106c, 106d, 106e and 106f as shown in FIG. 1B) of the movement detection antenna array 106 are processed. In particular in an exemplary embodiment of the present invention, 5M samples (5e6) from respective ten, 5 MHz sub-channels are processed to identify the frequencies at which the samples are acquired by the respective antennas (106c, 106d, 106e and 106f as shown in FIG. 1B) from the detected one or more RF sources 102. In particular, the frequencies of the radio waves acquired by the respective antennas (106c, 106d, 106e and 106f as shown in FIG. 1B) from the detected one or more RF source 102 are identified. The identified frequencies are representative of the frequencies at which the detected one or more RF source 102 is operating.

At step 206, movement in the detected RF sources is detected. In an embodiment of the present invention, 5M samples (5e6) from respective sub-channels are further processed to determine the movement in the detected one or more RF source 102 using one or more techniques as described later. In various embodiments of the present invention, the one or more techniques may include, but are not limited to, visibility phase measurement as a function of time and determination of spread power in spatial harmonics. In an exemplary embodiment of the present invention, 5e6 samples from all the ten sub-channels are processed simultaneously. The processing step is repeated for other set of sub-channels associated with subsequent 50 MHz frequency bands up to the maximum frequency band for e.g.: 5.95 GHz-6 GHz.

In an embodiment of the present invention, the technique of visibility phase measurement as a function of time includes receiving radio waves from the detected RF source 102 via the two or more antennas (106a and 106b as shown in FIG. 1A; 106c, 106d, 106e and 106f as shown in FIG. 1B) of the movement detection antenna array 106. In an embodiment of the present invention, the radio waves are captured at a center frequency of the selected frequency band to get the visibility, which is complex. The visibility is the cross power measured by the two antennas. In particular the phase of the visibility is a measure of the path difference of the detected source from the two or more antennas (106a and 106b as shown in FIG. 1A; 106c, 106d, 106e and 106f as shown in FIG. 1B) Therefore, any movement in the source, changes the path difference, further leading to a change in the phase difference. Similarly, for a stationary source the path difference, and hence the phase difference remains constant with time. Thus measuring the visibility phase as a function of time determines whether the RF source is moving or stationary.

In an embodiment of the present invention, an efficient phase change per unit time to detect the motion of the source is dependent on the baseline lengths between the two or more antennas (106a and 106b as shown in FIG. 1A; 106c, 106d, 106e and 106f as shown in FIG. 1B). In operation, in an exemplary embodiment of the present invention, as shown in FIG. 1B, the 5e6 samples received from respective channels associated with corresponding antennas (106c, 106d, 106e and 106f as shown in FIG. 1B) are processed based on the identified frequency of radio waves as discussed in para 39. In an exemplary embodiment of the present invention, with reference to FIG. 1B, shorter baselines are processed for radio waves within high frequency band (1 GHz to 6 GHz) and longer baselines are processed for radio waves within low frequency band (500 MHz to less than 1 GHz). Each chunk of 5e6 samples received from respective ten, 5 MHz sub-channels associated with each of the antennas are divided into 5000 smaller chunks, each having 1000 continuous samples. Further, for each baseline (for e.g.: AB of FIG. 1B depending on the frequency band) formed by corresponding two antennas (106c and 106d) and for respective first channels associated with said antennas (106c and 106d), a chunk of 5e6 samples received from first channel associated with one antenna and another chunk of 5e6 samples received from first channel associated with second antenna is divided into two 5000 smaller chunks, each having 1000 samples are obtained. Further, a cross power is computed by multiplying FFT of 1000 samples from one channel with complex conjugate of FFT of 1000 samples of another channel from which 5000 chunks of cross-power each having 1000 samples are obtained. Further, an average of 1000 successive chunks each having 1000 samples is computed and 5 cross-power chunks of 1000 samples are obtained as a result. Further, an angle average of 1000 samples for each of the 5 chunks is computed and 5 values are obtained. Further, the maximum-minimum of these 5 values representing phase deviation of the visibility function of a baseline is obtained for 1 s. The above step is repeated for each of the ten, 5 MHz channels associated with antennas (106c and 106d of FIG. 1B) to obtain phase deviation of the visibility function of a baseline for 1 s. The step of obtaining phase deviation of the visibility function is repeated for each baseline formed by corresponding antennas (106c, 106d, 106e and 106f of FIG. 1B). Further, a check is performed to determine if the obtained phase deviation of the visibility function of any of the baselines is greater than a predetermined threshold. The value of phase deviation of any of the baseline greater than the threshold is representative of a movement in the detected RF source. In the exemplary embodiment of the present invention as shown in FIG. 1B, a phase change for radio waves frequencies within 500 MHz to 6 GHz is measured. In the exemplary embodiment of the present invention, a phase deviation for radio waves received from a RF source operating at 2.4 GHz frequency is computed to be greater than a predetermined threshold of 1.5 rad, when the RF source is flying. The threshold value is frequency dependent and the values for each frequency are obtained by experimentation as done on 2.4 GHz. In various embodiments of the present invention, the predetermined threshold value is computed based on the desired maximum distance between the RF source and the antennas of the movement detection antenna array 106 from which RF source is to be detected, the speed at which the RF source is moving and the baseline lengths and varying multipath.

In an embodiment of the present invention, the determination of spread power in spatial harmonics is indicative that the detected RF source is moving. In general, visibility of any particular radio wave frequency received from the RF source such as a drone has an amplitude and phase constant with time and space when the RF source is stationary, as observed at the two or more antennas of the movement detection antenna array 106. Therefore, isolating the received visibility frequencies in the band after computing Fast Fourier Transform (FFT) and obtaining the amplitude and phase value of each of visibility frequency and plotting the amplitude and phase of the visibility as a function of time, the amplitude and phase of the visibility for any frequency remains constant within the limit of noise fluctuations. However, the amplitude and phase of the visibility for any frequency as observed at the two or more antennas of movement detection antenna array varies with time and space if the RF source is moving. Therefore, computing a Fourier transform of the frequencies in the FFT domain as a function of time, gives power that is not concentrated at 0 frequency but is spread among the harmonics. In an embodiment of the present invention determination of spread power in spatial harmonics comprises sampling RF signals carried by respective one or more radio waves within the selected frequency band received via the two or more antennas (106a and 106b; 106c, 106d, 106e and 106f) for respective baselines into digitized sampled RF signal and channelizing the selected frequency band for each of the two or more antennas into equal number of smaller frequency sub-channels to receive a predetermined number (N) of samples from each of the sub-channels. Further, each chunk of N samples received from respective sub-channels associated with each of the two antennas (106c, 106d, 106e and 106f) forming a baseline for each baseline is divided into N smaller chunks, each having M continuous samples. Furthermore, cross power for each of the corresponding sub-channels of the respective two antennas forming a baseline for each baseline is computed depending on the selected frequency range. The longer baselines are processed for a low frequency band and shorter baselines are processed for high frequency band. The cross power is computed by multiplying Fast Fourier Transform of M samples from one sub-channel of corresponding antenna with complex conjugate of Fast Fourier Transform M samples of another sub-channel of other corresponding antenna forming the baseline, wherein further N chunks of cross-power each having M samples are obtained for each baseline. Yet further, FFT of (N×FFT of (M)) for each of the corresponding sub-channels of the respective two antennas forming the baseline for each baseline is computed to obtain the spatial frequency distribution for all frequencies in each of the said sub-channel Finally a graph between the frequencies of the radio waves received by the movement detection antenna array and computed spatial frequencies of the radio waves are plotted to determine a movement in the RF source, wherein spatial power concentrated at "0" frequency indicates that the detected RF source is stationary and spatial power spread over the plot indicates that the RF source is moving.

In an exemplary embodiment of the present invention with reference to FIG. 1B, the shorter baselines are processed for radio waves within high frequency band (1 GHz to 6 GHz) and longer baselines are processed for radio waves within low frequency band (500 MHz to less than 1 GHz). Each chunk of 5e6 samples received from respective ten, 5 MHz sub-channels associated with each of the two antennas (106c, 106d, 106e and 106f as shown in FIG. 1B) forming a baseline is divided into 5000 smaller chunks, each having 1000 continuous samples. Further, for each baseline (for e.g.: AB of FIG. 1B depending on the frequency band) formed by corresponding two antennas (106c and 106d) and for respective first channels associated with said antennas (106c and 106d), a chunk of 5e6 samples received from first sub-channel associated with one antenna and another chunk of 5e6 samples received from first sub-channel associated with second antenna are divided into two 5000 smaller chunks, each having 1000 samples. A cross power is computed by multiplying FFT of 1000 samples from one sub-channel with complex conjugate of FFT of 1000 samples of another sub-channel from which 5000 chunks of cross-power each having 1000 samples are obtained. Further, FFT is performed in vertical direction of the matrix, implying FFT of (5000×FFT of (1000)) to obtain the spatial frequency distribution for all frequencies in the 5 MHz sub-channel associated with antennas (106c and 106d of FIG. 1B) for a frequency band of for e.g.: 500 MHz-550 GHz. The above step is repeated for each of the ten, 5 MHz channels associated with antennas (106c and 106d of FIG. 1B). Further, the above steps are repeated for each of the ten, 5 MHz channels associated with other antenna baselines depending on the frequency band. The same procedure is repeated for all the ten, 5 MHz channels of other frequency bands 550-600 MHz, 600-650 MHz up to 5.95-6 GHz.

Referring to FIG. 1D and FIG. 1E, a plot between the frequencies of the radio waves received by the movement detection antenna array and spatial frequencies is shown. As shown in FIG. 1D for a stationary RF source such as a drone, the power is concentrated at 0 frequency as the amplitude and phase of visibility remains constant as observed at the two or more antennas associated with the movement detection antenna array 106 with time. The ratio of the power at 0 spatial frequency to that of the other spatial frequencies is found to be greater than 15 units which indicates power is concentrated at 0 frequency. The power or amplitude spread across harmonics is represented by bright lines. Referring to FIG. 1D, there are no visible bright lines as a function of spatial frequency indicating the power is concentrated at 0 frequency and the RF source is stationary. As shown in FIG. 1E the power is spread over harmonics when the RF source is moving and the ratio of the power at 0 spatial frequency to that of the other spatial frequencies is found to be less than 6 units in each event of data collection indicating the power is spread among the harmonics of the spatial frequency. Referring to FIG. 1E, there are visible bright lines spread over spatial frequencies indicating spread in power or amplitude of radio waves over spatial frequencies. The visible bright lines are represented by green color and indicate that the RF source is moving. As shown in FIG. 1E, the spacing between the harmonics varies as the speed of the RF source is not constant. The spacing between the harmonics depends on the baseline length changes per unit time of sampled data. If the RF source such as a drone moves fast the baseline length for the RF source changes fast and hence the harmonics are widely spaced. Similarly, if the RF source such as a drone moves slower, the harmonics is more closely spaced. Also the spacing among the harmonics depends on the baseline length. More the baseline length, higher is the rate of change of amplitude and phase of visibility per unit sampling time as observed at the two or more antennas of the movement detection antenna array.

At step 208, interferometric images of the detected one or more RF sources are generated and location of said one or more sources are identified. In an embodiment of the present invention, a localization antenna subsystem (108 of FIG. 1) is tuned to the identified frequencies of operation of the one or more RF sources (as identified at step 204) one at a time. For e.g.: in a band of 500-550 MHZ, if the frequency of RF source is detected as 512 MHz, the localization antenna subsystem is tuned to 512 MHz. In an exemplary embodiment of the present invention, two images of the detected RF source are generated. As already described in the specification, the localization antenna subsystem 108 of FIG. 1, comprises two arrays 108A and 108B of 8 antennas each and total of 28 baselines per antenna array. A visibility measurement of RF signals extracted from radio waves received from respective two antennas forming a baseline, for each baseline is evaluated using the equation: $V(u,v)$ F.T $I(l,m)$; where F.T means a 2D Fourier transform; $V(u,v)$ is the visibility as a function of u and v and $I(l,m)$ is the intensity as a function of direction cosines l and m. In various embodiments of the present invention, u, v, l and m are integers. In operation, 28 visibilities are measured for each set of antenna arrays (108A and 108B of FIG. 1C). Further, a UV grid is formed for each set of antenna array (108A and 108B of FIG. 1C), where the center of the UV grid is the origin of a UV plane, where all baselines lengths in wavelengths are plotted with one end of baseline at origin. In an exemplary embodiment of the present invention, the UV grid is a matrix of 1000×1000 elements. All elements are initially assigned the value zero, and subsequently visibility measurement in the location of baseline is plotted in the grid. In an exemplary embodiment of the present invention, location of the baseline is $(X2-X1)/(wavelength/2)$, $(Y2-Y1)/(wavelength/2)$, where X1, Y1, X2, Y2 are the coordinates of respective antennas forming the baseline. In the exemplary embodiment of the present invention, 28 visibilities for 28 baselines corresponding to a set of antenna array are measured. All the baselines are plotted on the UV grid and corresponding visibility values are put in the corresponding baseline locations. Further, the inverse sign of the baseline coordinates is selected as locations in the grid and a conjugate of corresponding visibilities is set to those locations. In an exemplary embodiment of the present invention, a 2D FFT of the respective UV grids is computed and two images are obtained respectively. Each of the images comprises bright spots, where the bright spots are representative of RF sources in the respective images.

The localization and identification unit 124 is configured to determine if the received radio waves are from the same source or from a different source. In an embodiment of the present invention, a check is performed to determine if the bright spots in each of the two images are from the same RF source. As already discussed there is translation in Y axis for the two antenna subsystems (108A and 108B as shown in FIG. 1C) configured in log-spiral, therefore each of the two images are analyzed to identify if there is an axis value common for both the images. The axis value is discussed later in the specification. In a particular embodiment of the present invention, the common axis value is indicative that the bright spots in the two images are from the same RF source. In particular in an exemplary embodiment of the present invention as already described above, the localization antenna subsystem 108 comprises a pair of antenna arrays (108A and 108B of FIG. 1C) arranged in log-spiral configuration, each comprising 8 antennas and the two sets of 8 antennas are arranged in such a way that their axes have a translation in Y direction with respect to each other and their X and Z axes are parallel. Each of the two images have l, m axes where l and m are the direction cosines with respect to the zenith, which is the center of the image. Both l and m have respective axis values for respective images. Presence of translation only in Y direction is indicative that one of the direction cosines of l or m have same value at any instant of time in the two images for the common bright spot. For e.g.: at one instant of time the direction cosines of l may have a value 2 in both the images, similarly in another instant of time the direction cosines of l may have a value 3 in both the images.

Referring to FIG. 1F the image obtained from one of the two sets of antenna arrays is shown. Referring to FIG. 1G the image obtained from another of the two sets of antenna arrays is shown. The images shown in FIGS. 1F and 1G are a plot between the direction cosine l on the x-axis and direction cosine m on the y-axis. The images shown in FIGS. 1F and 1G are obtained by translating only the Y axis with respect to each other. In an embodiment of the present invention, a horizontal line through the center is representative of l axis and a vertical line through the center is representative of m axis. As can be seen from FIGS. 1F and 1G, m is different for the bright spot and l is constant, indicating that the bright spots are generated by the same RF source. It is to be understood, that X and Y have are different from l and m. As stated previously, l and m are direction cosines whereas X and Y are Cartesian coordinates. If the bright spots are from the same RF source, the two directions of RF source from the centers of two coordinate systems are further evaluated from the two obtained images. The exact location of the RF source is evaluated from the two directions from where they intersect in space.

At step 210, the detected RF source is categorized as airborne or ground based using the generated interferometric images. In an embodiment of the present invention, the detected RF source is mapped in azimuth and elevation. The map represents all the interfering sources and the actual RF source as points as a function of azimuth and elevation.

At step 212, a type of RF source is identified on determination that the RF source is airborne. In an embodiment of the present invention, on determination that the detected RF source is airborne, the interferometric images are further processed to confirm the type of airborne source. In particular, the velocity and acceleration of the detected RF source is evaluated based on movement of the RF source in space. Further, the velocity and the height at which the RF source flies is analyzed to identify if the RF source is a drone or some other UAV. In general a drones flies lower than fixed-wing aircraft. Additionally, the angle of ascent or decent of the RF source is analyzed. The angle of ascent or decent of the RF source is computed during localization. A steep angle is indicative of a drone and other angle may indicate other UAVs or aircraft. At step 214, an alarm notification is generated around the desired area.

Figure 3:
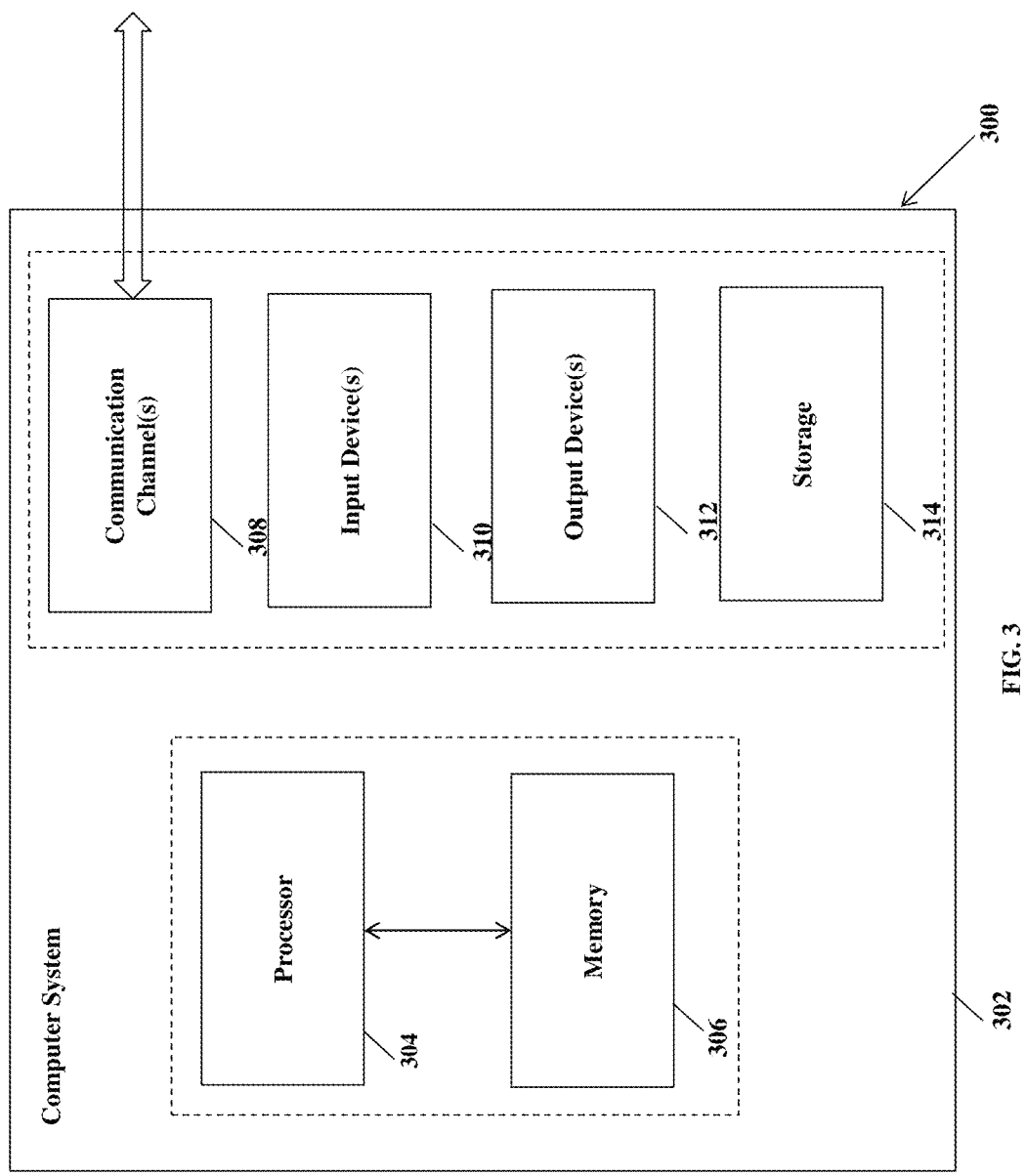
FIG. 3 illustrates an exemplary computer system in which various embodiments of the present invention may be implemented.

FIG. 3 illustrates an exemplary computer system in which various embodiments of the drone detection engine of present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

The invention claimed is:

1. A system for detecting and localizing Unmanned Aerial Vehicles (UAVs), the subsystem comprising:
a memory storing program instructions; and
a processor configured to execute program instructions stored in the memory, the computation subsystem configured to:
detect presence of one or more RF sources around a desired area based on an analysis of a power level of radio waves received within a selected frequency band around the desired area from a movement detection antenna array;
identify frequencies of the radio waves received from the detected one or more RF sources based on the analysis;
determine movement of the detected one or more RF sources based on spatial frequencies of the radio waves, wherein the spatial frequencies are computed to identify presence of spread power in spatial harmonics based on the identified frequencies of the radio waves, and wherein the spatial frequencies are computed by computing a cross power of the identified frequencies received via two or more antennas of the movement detection antenna array for respective baseline distances, wherein changes in a phase difference of the computed cross power indicates movement in the detected RF source; and identify location of the detected one or more RF sources via a localization antenna subsystem, the localization antenna subsystem is tuned to the identified frequencies of the radio waves.

2. The system as claimed in claim 1, wherein the detected one or more RF source are categorized as an airborne source or a ground-based source based on generated interferometry images associated with the detected RF sources, wherein categorizing comprises mapping the detected RF sources in azimuth and elevation and identifying the detected RF sources based on the determination that the RF sources are airborne, wherein one or more parameters comprising one or more of velocity, acceleration, height, and angle of ascent or descent of the RF sources are evaluated and analyzed.

3. The system as claimed in claim 1, wherein the movement detection antenna array is configured to receive the radio waves within the selected frequency band, wherein the selected frequency band ranges within 30 Hertz to 20 GHz.

4. The system as claimed in claim 1, wherein the baseline distances between the two or more antennas are evaluated based on a frequency and an estimated speed of operation of the one or more RF sources and a desired distance from the movement detection antenna array to detect the RF source.

5. The system as claimed in claim 1, wherein a height of the two or more antennas is computed based on type of the antennas and effects of varying multipaths associated with the antennas, the height of the two or more antennas ranges between 5 m-30 m, and the antenna type may be selected from a group comprising of omnidirectional antennas, directional antennas and spiral antennas.

6. The system as claimed in claim 1, wherein the movement detection antenna array comprises four antennas interfacing with a software defined radio (SDR) to receive the radio waves within the frequency band ranging between 500 MHz and 6 GHz, and positions of the antennas in relation to each other are selected based on the respective baseline distances, wherein the baseline distances (AB, BC, CD) between antennas is 31 m, 18 m and 18 m respectively, the shorter baselines are configured for processing radio waves within a high frequency band ranging between 1 GHz to 6 GHz and the longer baselines are configured for processing radio waves within low frequency band ranging between 500 MHz to less than 1 GHz.

7. The system as claimed in claim 1, wherein the localization antenna subsystem comprises two or more sets of antenna arrays arranged in a log spiral configuration such that a center of the spiral configuration is the center of a Cartesian coordinate system, said localization antenna subsystem configured to receive radio waves transmitted within the selected frequency band.

8. The system as claimed in claim 7, wherein the two or more sets of antenna arrays comprises eight antennas respectively, arranged in a spiral configuration such that the baseline distances between each of the successive antennas of respective antenna arrays are integer multiples of half of a longest wavelength in the selected frequency band.

9. The system as claimed in claim 1, wherein the localization antenna subsystem comprises two antenna arrays configured to receive the radio waves within frequency band ranging from 500 MHz-6 GHz, the two sets antenna arrays are arranged such that the axes of the respective antenna arrays have a translation in Y direction with respect to each other and their X and Z axes are parallel, and wherein the spiral configuration of the two antennas arrays are separated by a distance in Y direction on the ground.

10. The system as claimed in claim 9, wherein the separation between the antenna arrays is evaluated based on a maximum desired distance between the RF source and the two antenna arrays from where images of the detected RF source are to be plotted.

11. The system as claimed in claim 10, wherein the separation between the antenna arrays is evaluated as a minimum of ¼ of a desired distance between the RF source and the two antenna arrays from where images of the detected RF source are to be plotted.

12. The system as claimed in claim 1, wherein determining the presence of one or more RF sources around the desired area comprises the step of:
sampling RF signals carried by the respective radio waves within the selected frequency band into a digitized sampled RF signal;
channelizing the selected frequency band into equal number of smaller frequency channels and receiving 200 k samples from each of the smaller channels; and
performing a check to determine if the power level of each set of 200K samples is greater than a predetermined threshold (P), wherein a power level greater than the threshold is indicative of the presence of the RF source.

13. The system as claimed in claim 1, wherein the movement in the detected one or more RF source is determined by computing a visibility phase measurement as a function of time which includes computing a cross power of the RF signals carried by the radio waves received via the two or more antennas for respective baseline distances, the cross power is representative of the visibility and the phase of the visibility is a measure of a path difference of the detected source from the two or more antennas, and determining any change in the path difference, wherein the change in path difference changes the phase difference indicating the movement in the detected RF source.

14. The system as claimed in claim 1, wherein the determination of spread power in spatial harmonics comprises:
sampling RF signals carried by the respective radio waves within the selected frequency band received via the two or more antennas for respective baselines into a digitized sampled RF signal and channelizing the selected frequency band for each of the two or more antennas into equal number of smaller frequency sub-channels to receive a predetermined number (N) of samples from each of the sub-channels;
dividing each chunk of N samples received from the sub-channels associated with each of the two antennas forming a baseline for each baseline into N smaller chunks, each having M continuous samples;
computing the cross power for each of the corresponding sub-channels of the two antennas forming a baseline for each baseline depending on the selected frequency range, wherein the longer baselines are processed for a low frequency band and shorter baselines are processed for a high frequency band, wherein the cross power is computed by multiplying Fast Fourier Transform of M samples from one sub-channel of corresponding antenna with complex conjugate of Fast Fourier Transform M samples of another sub-channel of other corresponding antenna forming the baseline, wherein further N chunks of cross-power each having M samples are obtained for each of the baselines;
computing FFT of (N×FFT of (M)) for each of the corresponding sub-channels of the two antennas forming the baseline for each baseline to obtain the spatial frequency distribution for all frequencies in each of the sub-channels; and plotting a graph between the frequencies of the radio waves received by the movement detection antenna array and computed spatial frequencies of the radio waves to determine the movement in the RF source, wherein a spatial power concentrated at "0" frequency indicates that the detected RF source is stationary and a spatial power spread over the plot indicates that the RF source is moving.

15. The system as claimed in claim 1, wherein interferometric images of the detected one or more RF sources are generated by:
computing a visibility measurement of the radio waves received for each of the baseline distances associated with the antenna arrays;
plotting each of the baselines distances in wavelengths with one end of a baseline at an origin for each set of antenna array in respective UV grids, where a center of the UV grids is the origin of a UV plane, wherein the computed visibility measurement is plotted as a location of the baseline in the UV grid for respective antenna arrays, and wherein location of the baseline is (X2−X1)/(wavelength/2), (Y2−Y1) (wavelength/2), where X1, Y1, X2, Y2 are the coordinates of respective antennas forming respective baselines; and
a 2D FFT of the respective UV grids is computed and the interferometric images are generated for each set of the antenna array, wherein bright spots in the respective images are representative of the detected one or more RF sources.

16. The system as claimed in claim 15, wherein a check is performed to determine if the bright spots in the respective images are from the same RF source, wherein axis values of axes l and m for respective images are analyzed, and a common axis value of at least one of the axis l or m indicates that the bright spots are from the same RF source.

17. A method for detecting and localizing Unmanned Aerial Vehicles (UAVs), wherein the method is implemented by at least one processor executing program instructions stored in a memory, the method comprising:
detecting, by the processor, presence of one or more RF sources around a desired area based on an analysis of a power level of radio waves received within a selected frequency band around the desired area from a movement detection antenna array;
identifying, by the processor, frequencies of the radio waves received from the detected one or more RF sources based on the analysis;
determining, by the processor, movement of the detected one or more RF sources based on spatial frequencies of the radio waves, wherein the spatial frequencies are computed to identify presence of spread power in spatial harmonics based on the identified frequencies of the radio waves, and wherein the spatial frequencies are computed by computing a cross power of the identified frequencies received via two or more antennas of the movement detection antenna array for respective baseline distances, wherein changes in a phase difference of the computed cross power indicates movement in the detected RF source; and
identifying, by the processor, location of the detected one or more RF sources via a localization antenna subsystem, the localization antenna subsystem is tuned to the identified frequencies of the radio waves.

18. The method as claimed in claim 17, wherein the detected one or more RF sources are categorized as an airborne source or a ground-based source based on generated interferometry images of the detected RF sources, wherein categorizing comprises mapping the detected RF sources in azimuth and elevation and identifying the detected RF sources based on the determination that the RF sources are airborne, wherein one or more parameters comprising velocity, acceleration, height, and angle of ascent or descent of the respective RF sources are evaluated and analyzed.

19. The method as claimed in claim 17, wherein the movement detection antenna array is configured to receive the radio waves within the selected frequency band, wherein the selected frequency band ranges within 30 Hertz to 20 GHz.

20. The method as claimed in claim 17, wherein the baseline distances between the two or more antennas are evaluated based on frequency and estimated speed of operation of the RF sources and a desired distance from the movement detection antenna array to detect the RF sources.

21. The method as claimed in claim 17, wherein a height of the two or more antennas is computed based on type of the antennas and effects of varying multipaths of the antennas, the height of the two or more antennas ranges between 5 m-30 m, and the antenna type may be selected from a group comprising of omnidirectional antennas, directional antennas and spiral antennas.

22. The method as claimed in claim 17, wherein the movement detection antenna array comprises four antennas interfacing with a software defined radio (SDR) to receive the radio waves within the frequency band ranging between 500 MHz and 6 GHz, and positions of the antennas in relation to each other are selected based on the respective baseline distances, wherein the baseline distances (AB, BC, CD) between antennas is 31 m, 18 m and 18 m respectively, the shorter baselines are configured for processing radio waves within a high frequency band ranging between 1 GHz to 6 GHz and the longer baselines are configured for processing radio waves within low frequency band ranging between 500 MHz to less than 1 GHz.

23. The method as claimed in claim 17, wherein the localization antenna subsystem comprises two or more sets of antenna arrays arranged in a log spiral configuration such that a center of the spiral configuration is the center of a Cartesian coordinate system, said localization antenna subsystem configured to receive radio waves transmitted within the selected frequency band.

24. The method as claimed in claim 23, wherein the localization antenna subsystem comprises two antenna arrays configured to receive the radio waves within frequency band ranging from 500 MHz-6 GHz, the two sets antenna arrays are arranged such that the axes of the respective antenna arrays have a translation in Y direction with respect to each other and their X and Z axes are parallel, and wherein the spiral configuration of the two antennas arrays are separated by a distance in Y direction on the ground.

25. The method as claimed in claim 24, wherein the separation between the antenna arrays is evaluated based on a maximum desired distance between the RF sources and the two antenna arrays from where the images of the detected RF sources are to be plotted.

26. The method as claimed in claim 25, wherein the separation between the antenna arrays is evaluated as a minimum of ¼ of a distance between the RF source and the two antenna arrays from where images of the detected RF sources are to be plotted.

27. The method as claimed in claim 23, wherein the two or more sets of antenna arrays comprises eight antennas, respectively, arranged in a spiral configuration such that the baseline distances between each of the successive antennas of respective antenna arrays are integer multiples of half of a longest wavelength in the selected frequency band.

28. The method as claimed in claim 17, wherein determining the presence of one or more RF sources around the desired area comprises the step of:
sampling RF signals carried by the radio waves within the selected frequency band into a digitized sampled RF signal;
channelizing the selected frequency band into equal number of smaller frequency channels and receiving 200 k samples from each of the smaller channels; and
performing a check to determine if the power level of each set of 200K samples is greater than a predetermined threshold (P), wherein a power level greater than the threshold is indicative of the presence of the RF source.

29. The method as claimed in claim 17, wherein the movement in the detected one or more RF source is determined by computing visibility phase measurement as a function of time, which includes computing a cross power of the identified frequencies, the cross power is representative of the visibility and phase of the visibility is a measure of a path difference of the detected RF sources from the two or more antennas, and determining any change in the path difference, wherein the change in path difference changes the phase difference indicating the movement in the detected RF source.

30. The method as claimed in claim 17, wherein the determination of spread power in spatial harmonics comprises:
sampling RF signals carried by the radio waves within the selected frequency band received via the two or more antennas for respective baselines into a digitized sampled RF signal and channelizing the selected frequency band for each of the two or more antennas into equal number of smaller frequency sub-channels to receive a predetermined number (N) of samples from each of the sub-channels;
dividing each chunk of N samples received from respective sub-channels associated with each of the two antennas forming a baseline for each baseline into N smaller chunks, each having M continuous samples;
computing the cross power for each of the corresponding sub-channels of the respective two antennas forming a baseline for each baseline depending on the selected frequency range, wherein the longer baselines are processed for a low frequency band and shorter baselines are processed for a high frequency band, wherein the cross power is computed by multiplying Fast Fourier Transform of M samples from one sub-channel of corresponding antenna with complex conjugate of Fast Fourier Transform M samples of another sub-channel of other corresponding antenna forming the baseline, wherein further N chunks of cross-power each having M samples are obtained for each baseline;
computing FFT of (N×FFT of (M)) for each of the corresponding sub-channels of the respective two antennas forming the baseline for each baseline to obtain the spatial frequency distribution for all frequencies in each of the sub-channels; and
plotting a graph between the frequencies of the radio waves received by the movement detection antenna array and computed spatial frequencies of the radio waves to determine the movement in the RF source, wherein a spatial power concentrated at "0" frequency indicates that the detected RF source is stationary and a spatial power spread over the plot indicates that the RF source is moving.

31. The method as claimed in claim 17, wherein the method comprises the step of generating interferometric images of the detected one or more RF sources by:
computing a visibility measurement of the radio waves received for each baseline distance associated with the respective antenna arrays;
plotting each of the baselines distances in wavelengths with one end of baseline at an origin for each set of the antenna arrays in respective UV grids, where a center of the UV grids is the origin of a UV plane, wherein the computed visibility measurements is plotted as a location of the baseline in the UV grid for respective antenna arrays, and wherein the location of the baseline is (X2−X1)/(wavelength/2), (Y2−Y1)/(wavelength/2), where X1, Y1, X2, Y2 are the coordinates of respective antennas forming respective baselines; and
a 2D FFT of the respective UV grids is computed and the interferometric images are generated for each set of the antenna arrays, wherein bright spots in the respective images are representative of the detected one or more RF sources.

32. The method as claimed in claim 31, wherein a check is performed to determine if the bright spots in respective images are from the same RF source, wherein axis values of axes l and m for respective images are analyzed, and a common axis value of at least one of the axis l or m indicates that the bright spots are from the same RF source.

* * * * *